(12) United States Patent
Matsuo et al.

(10) Patent No.: US 10,931,112 B1
(45) Date of Patent: Feb. 23, 2021

(54) RENEWABLE ENERGY POWER GENERATION AND STORAGE CONTROL DEVICE FOR REVERSE FLOW PREVENTION TYPE SELF-CONSUMPTION

(71) Applicant: MATSUO CONSTRUCTION CO., LTD., Saga (JP)

(72) Inventors: Tetsugo Matsuo, Saga (JP); Nobuhiro Fujiyoshi, Saga (JP); Sinichi Kenki, Saga (JP); Hideaki Tanaka, Saga (JP); Toshiyuki Shima, Saga (JP)

(73) Assignee: MATSUO CONSTRUCTION CO., LTD., Saga (JP)

( * ) Notice: Subject to any disclaimer, the term of this patent is extended or adjusted under 35 U.S.C. 154(b) by 0 days.

(21) Appl. No.: 17/045,974

(22) PCT Filed: Apr. 16, 2019

(86) PCT No.: PCT/JP2019/016256
§ 371 (c)(1),
(2) Date: Oct. 7, 2020

(87) PCT Pub. No.: WO2019/203211
PCT Pub. Date: Oct. 24, 2019

(30) Foreign Application Priority Data

Apr. 18, 2018 (JP) .............................. JP2018-79749

(51) Int. Cl.
*H02J 3/14* (2006.01)
*H02J 3/46* (2006.01)
(Continued)

(52) U.S. Cl.
CPC .................... *H02J 3/14* (2013.01);
*H02J 3/24* (2013.01); *H02J 3/32* (2013.01);
*H02J 3/381* (2013.01);
(Continued)

(58) Field of Classification Search
CPC ...... H02J 3/14; H02J 7/35; H02J 3/381; H02J 3/24; H02J 3/32; H02J 3/46; H02J 2300/24
See application file for complete search history.

(56) References Cited

U.S. PATENT DOCUMENTS

| 2013/0110304 A1* | 5/2013 | Shiga | ..................... B60L 55/00 |
| | | | 700/295 |
| 2014/0257584 A1* | 9/2014 | Tanimoto | ................ H02J 3/383 |
| | | | 700/291 |

(Continued)

FOREIGN PATENT DOCUMENTS

| JP | 2003-299247 A | 10/2003 |
| JP | 2004-040956 A | 2/2004 |

(Continued)

*Primary Examiner* — Ziaul Karim
(74) *Attorney, Agent, or Firm* — Heedong Chae; Lucem, PC

(57) ABSTRACT

A control device including a power generation amount detector, a flow detecting unit which detects an amount of flow power and outputs the flow power amount as a flow signal, a flow control unit which compares a preset target value with the flow signal and outputs a flow operation amount, a power generation control unit which outputs an amount of generated power, an instantaneous power transmitter which detects instantaneous power and outputs the instantaneous power as an instantaneous power signal, a demand control unit which outputs a demand operation amount, and a setting value calculating unit which obtains a demand target value, outputs the demand operation amount according to the result of a comparison of the demand target value with the instantaneous power signal, and determines whether to change a setting value according to the amount of power being output from the power conditioner for power generation.

4 Claims, 27 Drawing Sheets

(51) Int. Cl.
   *H02J 3/24*   (2006.01)
   *H02J 3/38*   (2006.01)
   *H02J 7/35*   (2006.01)
   *H02J 3/32*   (2006.01)

(52) U.S. Cl.
   CPC .................................... *H02J 3/46* (2013.01);
      *H02J 7/35* (2013.01); *H02J 2300/24* (2020.01)

(56) References Cited

U.S. PATENT DOCUMENTS

2016/0216722 A1\* 7/2016 Tokunaga .............. G05B 15/02
2017/0221161 A1\* 8/2017 Kudo .................... G06F 1/3212
2017/0317507 A1\* 11/2017 Kudo ..................... H02J 7/007

FOREIGN PATENT DOCUMENTS

| JP | 2012-175858 A | 9/2012 |
| JP | 5606645 B | 10/2014 |
| JP | 5823646 B | 11/2015 |
| JP | 2017-022865 A | 1/2017 |
| JP | 2017-121171 A | 7/2017 |
| JP | 2017-169292 A | 9/2017 |
| JP | 2018-011462 A | 1/2018 |
| WO | 2017-090173 A1 | 6/2017 |

\* cited by examiner

Commercial power system
On-site load

Commercial power system-side
phase state

On-site load-side
phase state

RENEWABLE ENERGY POWER GENERATION AND STORAGE CONTROL DEVICE FOR REVERSE FLOW PREVENTION TYPE SELF-CONSUMPTION

TECHNICAL FIELD

The present invention relates to a renewable energy power generation and storage control device for reverse flow prevention type self-consumption which enables electrical grid stabilization, automatic charging and discharging of a storage battery, demand control, and energy conservation.

BACKGROUND ART

At present, most domestic renewable energy plans are directed toward the introduction of the full-scale purchasing scheme (FIT: Feed-in Tariff). However, because of limitations related to the power grid connection capacity of the commercial power system and the voltage frequency adjustment range due to renewable energy fluctuations, shutdown of renewable power generation equipment in accordance with "output suppression regulations" has been carried out on holidays. On the other hand, however, the government has also indicated its future intention to introduce renewable energy at nearly twice the current size of renewable energy based on the Kyoto Protocol.

In general, renewable power generation equipment is connected to a power grid of a commercial power system by "grid-interconnection technology" that performs uninterrupted connection, and renewable energy generated on holidays, etc., is greater than the self-consumption power load (hereinafter "an on-site load") of consumers of electric power, and therefore, on holidays, etc., suspension of power generation by the renewable power generation equipment (hereinafter "renewable energy power generation") has been demanded.

CITATION LIST

Patent Literatures

Patent Literature 1: Japanese Patent No. 5823646
Patent Literature 2: Japanese Patent No. 5606645

SUMMARY OF INVENTION

Technical Problem

However, even if the renewable energy power generation is performed to the extent possible on holidays, a reduction in electricity rates and a reduction in carbon dioxide emissions can be realized. If surplus electricity due to the renewable energy power generation is additionally stored in energy storage equipment such as a storage battery, those effects can be further increased.

Therefore, an object of the present invention is to provide a renewable energy power generation and storage control device for reverse flow prevention type self-consumption which enables automatically controlling generated power so as to be consumed only on the premises of a consumer of electric power (hereinafter "on-site") or be stored in storage equipment so that generated renewable energy power does not affect the commercial power system on-site.

Solution to Problem

An object of this invention is to provide a renewable energy power generation and storage control device for reverse flow prevention type self-consumption according to a first aspect of the invention for solving the problem described above is characterized by including one or two or more power generation devices which generate electric power from renewable energy; an electric power converter for power generation connected to each of the power generation devices and capable of conditioning an output amount of the electric power generated by the power generation device; a power generation amount detecting unit which detects an amount of power output from the electric power converter for power generation and outputs the amount of power as a power generation signal; a flow detecting unit which detects an amount of power supplied from a commercial power system and outputs the amount of power as a flow signal; a flow control unit which outputs a flow operation amount according to the result of a comparison of a preset target value with the flow signal; a power generation control unit which controls the amount of power output from the electric power converter for power generation based on the flow operation amount input from the flow control unit; an instantaneous power detecting unit which detects instantaneous power supplied to all loads that are supplied with electric power from the commercial power system through a power receiving point and outputs the instantaneous power as an instantaneous power signal; a demand control unit which outputs a demand operation amount to make power consumption of all loads close to a demand target value only for a load capable of automatic control of the electric power out of all loads; and a setting value calculating unit which obtains the demand target value. The power generation control unit sets a power generation target value based on the flow operation amount, obtains an amount of generated power to be output from the electric power converter for power generation based on the result of a comparison of the power generation target value with the power generation amount signal, and outputs the amount of generated power as a power generation operation amount. The demand control unit outputs the demand operation amount to the load capable of automatic control of the electric power according to the result of a comparison of the demand target value obtained by the setting value calculating unit with the instantaneous power signal. The setting value calculating unit determines whether to change a setting value according to the amount of power being output from the electric power converter for power generation.

Further, a renewable energy power generation and storage control device for reverse flow prevention type self-consumption according to a second aspect of the invention is characterized, in the first invention, by further including a storage device; an electric power converter for power charge capable of conditioning an output amount of electric power to the storage device; a charge amount detecting unit which detects an amount of charging power into the storage device and outputs a charge amount signal; and a charge control unit which controls an amount of power output from the electric power converter for power charge based on the power generation operation amount, in that the charge control unit sets a charging target value based on the power generation operation amount, obtains an amount of charging power to be output from the electric power converter for power charge according to the result of a comparison of the charging target value with the charge amount signal, and outputs the amount of charging power as a charge operation amount.

Another object of the present invention is to provide a renewable energy power generation and storage control device for reverse flow prevention type self-consumption according to a third aspect of the invention is characterized, in the second invention, in that the charge control unit sets a charging rate so that a charging rate when the power generation operation amount is smaller than a preset threshold is faster compared with a charging rate when the power generation operation amount is greater than the threshold.

Further, a renewable energy power generation and storage control device for reverse flow prevention type self-consumption according to a fourth aspect of the invention is characterized, in either one of the second or third invention, by further including an electric power converter for power discharge capable of conditioning an output amount of electric power from the storage device; a discharge amount detecting unit which detects an amount of discharged power from the storage device and outputs a discharge amount signal; and a discharge control unit which controls an amount of power output from the electric power converter for power discharge. The discharge control unit sets a discharging target value based on the flow operation amount, obtains an amount of discharged power to be output from the electric power converter for power discharge according to the result of a comparison of the discharging target value with the discharge amount signal, and outputs the amount of discharged power as a discharge operation amount when a predetermined amount or more of power generation is not detected by the power generation amount detecting unit.

Advantageous Effects of Invention

By the first aspect of the invention, it is possible to operate generated renewable energy power that easily changes depending on weather conditions as efficiently as possible within a range of not causing a reverse flow, and the setting value of the demand control device that changes depending on renewable energy power generation can be automatically set according to the amount of renewable energy power generation, so that an optimal demand control is enabled.

Moreover, by the second and third aspects of the invention, it is possible to automatically charge only surplus electricity according to the amount of generated renewable energy power subjected to suppression control into the energy storage equipment. Further, by the fourth aspect of the invention, electricity can be automatically and quickly supplied from the storage battery or the like only to the on-site load within a range of not causing a reverse flow when renewable energy power generation is not performed.

DESCRIPTION OF EMBODIMENTS

Hereinafter, a renewable energy power generation and storage control device for reverse flow prevention type self-consumption according to the present invention will be described by use of drawings.

Example 1

Description will be given of a renewable energy power generation and storage control device for reverse flow prevention type self-consumption according to Example 1 of the present invention by use of FIGS. 1A-B to FIG. 23.

Figure 1A:
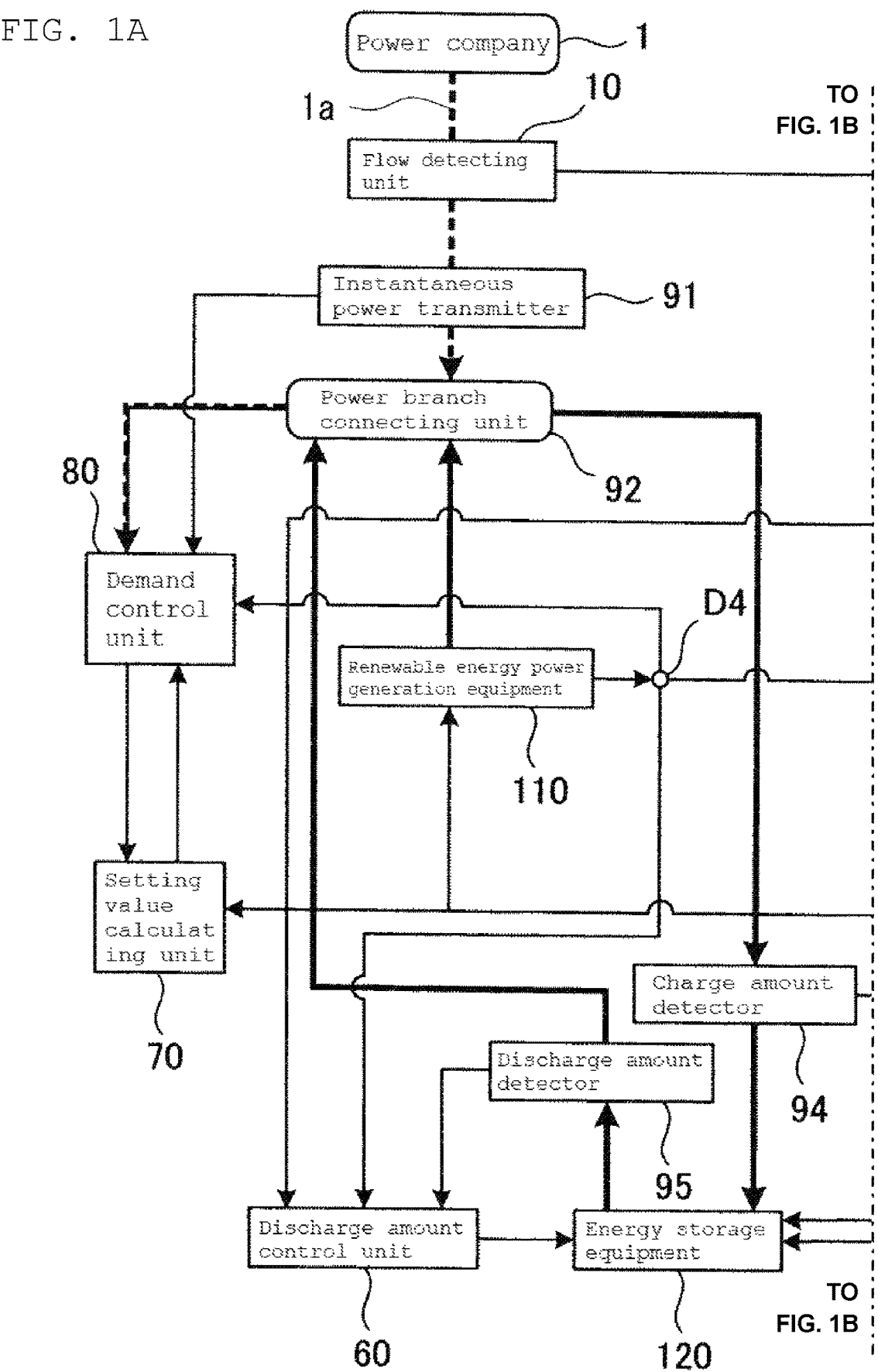
FIGS. 1A-B illustrate an overall configuration diagram of a renewable energy power generation and storage control device for reverse flow prevention type self-consumption according to Example 1 of the present invention.
Figure 1B:
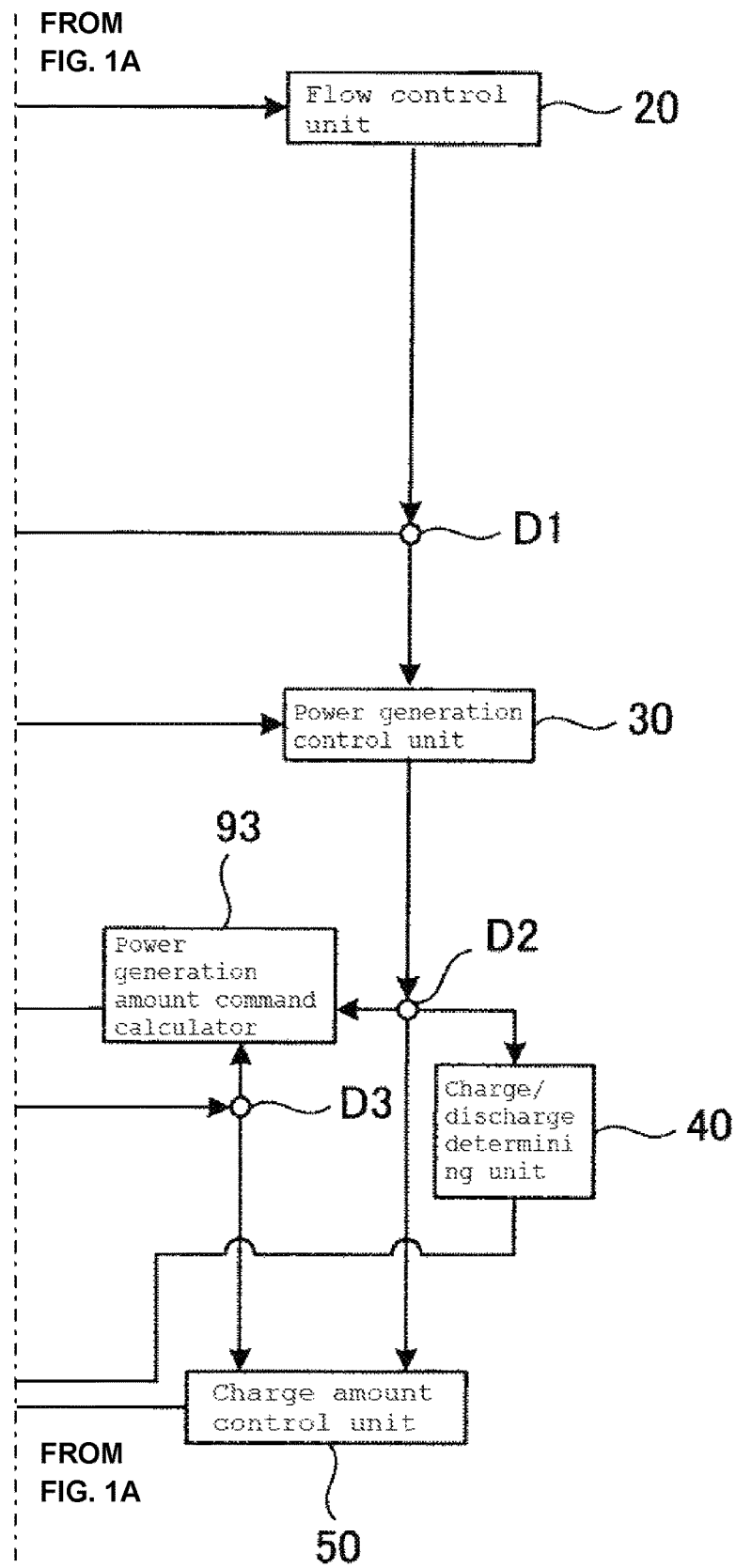

As shown in FIGS. 1A-B, the renewable energy power generation and storage control device for reverse flow prevention type self-consumption according to the present example is configured by including a flow detecting unit 10, a flow control unit 20, a power generation control unit 30, a charge/discharge determining unit 40, a charge amount control unit 50, a discharge amount control unit 60, a setting value calculating unit 70, a demand control unit 80, renewable energy power generation equipment (in the present example, provided as photovoltaic power generation equipment of 500 kW) 110, and energy storage equipment (a storage battery device for surplus generated renewable energy power) 120.

The flow detecting unit 10 has a function of detecting instantaneous power of commercial power (hereinafter "flow power") that flows in from a power grid 1a of a commercial power system (a local general electricity transmission utility or an electricity transmission utility (Electric Business Act amended in April 2016), hereinafter "power company") 1.

The flow control unit 20 has a function of controlling the flow power (instantaneous power) that flows in from the power grid 1a to a constant value.

The power generation control unit 30 has a function of controlling power generated by the renewable energy power generation equipment 110 in order to make the flow power (instantaneous power) that flows in from the power grid 1a a constant value. On the other hand, for simplification of the device, output of the flow control unit 20 is sometimes directly output to the renewable energy power generation equipment 110 to be subjected to direct control. In this case, a situation occurs such that a change in power generation amount due to a change in weather conditions affects flow control directly. In addition, the function for controlling power generated by the renewable energy power generation equipment 110 is the same as the autonomous stably-supplying type renewable energy control device described in Patent Literature 1 described above, and therefore, a detailed description thereof will be omitted here.

The charge/discharge determining unit 40 determines timing of charge and discharge using the energy storage equipment 120.

The charge amount control unit 50 as a charge control unit has a function of controlling a charging rate so as to store only a surplus of power generated by the renewable energy power generation equipment 110 (hereinafter "surplus electricity") in the energy storage equipment 120 without using the flow power from the power grid 1a.

The discharge amount control unit 60 as a discharge control unit has a function of controlling a discharging rate so as to discharge discharged power from the energy storage equipment 120 only to an on-site load 86 (see FIGS. 15A-C) within a range in which a reverse flow does not occur to the power company 1 side.

The setting value calculating unit 70 has a function of automatically changing a demand target value of the demand control unit 80 installed on-site when interconnected operation of the flow power with the power generated by the renewable energy power generation equipment 110 installed on-site is performed.

The demand control unit 80 has a function that is the same as the target value setting type demand power control device described in Patent Literature 2 described above, and a detailed description thereof will be omitted here.

Reference sign 91 shown in FIG. 1A denotes an instantaneous power transmitter as an instantaneous power detection unit that detects the instantaneous power of electric power from the power grid 1a and outputs the instantaneous power as a standard instrumentation signal, 92 denotes a power branch connecting unit that supplies the flow power from the power company 1 and generated renewable energy power from the renewable energy power generation equipment 110 to the on-site load 86 and the energy storage equipment 120, 93 denotes a power generation amount command calculator that calculates a power generation amount from a power generation operation signal $S_{34}$ output from the power generation control unit 30 to be described later in detail and a charge amount signal $S_{94}$ output from a charge amount detector 94 and outputs a power generation amount command signal $S_{93}$, 94 denotes the charge amount detector that detects a charge amount by the renewable energy power generation equipment 110 and outputs the charge amount signal $S_{94}$, 95 denotes a discharge amount detector that detects a discharge amount from the energy storage equipment 120 and outputs a discharge amount signal $S_{95}$, and D1 to D4 denote first to fourth branching portions that branch signals input thereto.

<Flow Control>

Description will be given of the flow control in the present example by use of FIGS. 2A-C to FIG. 10.

Figure 2A:
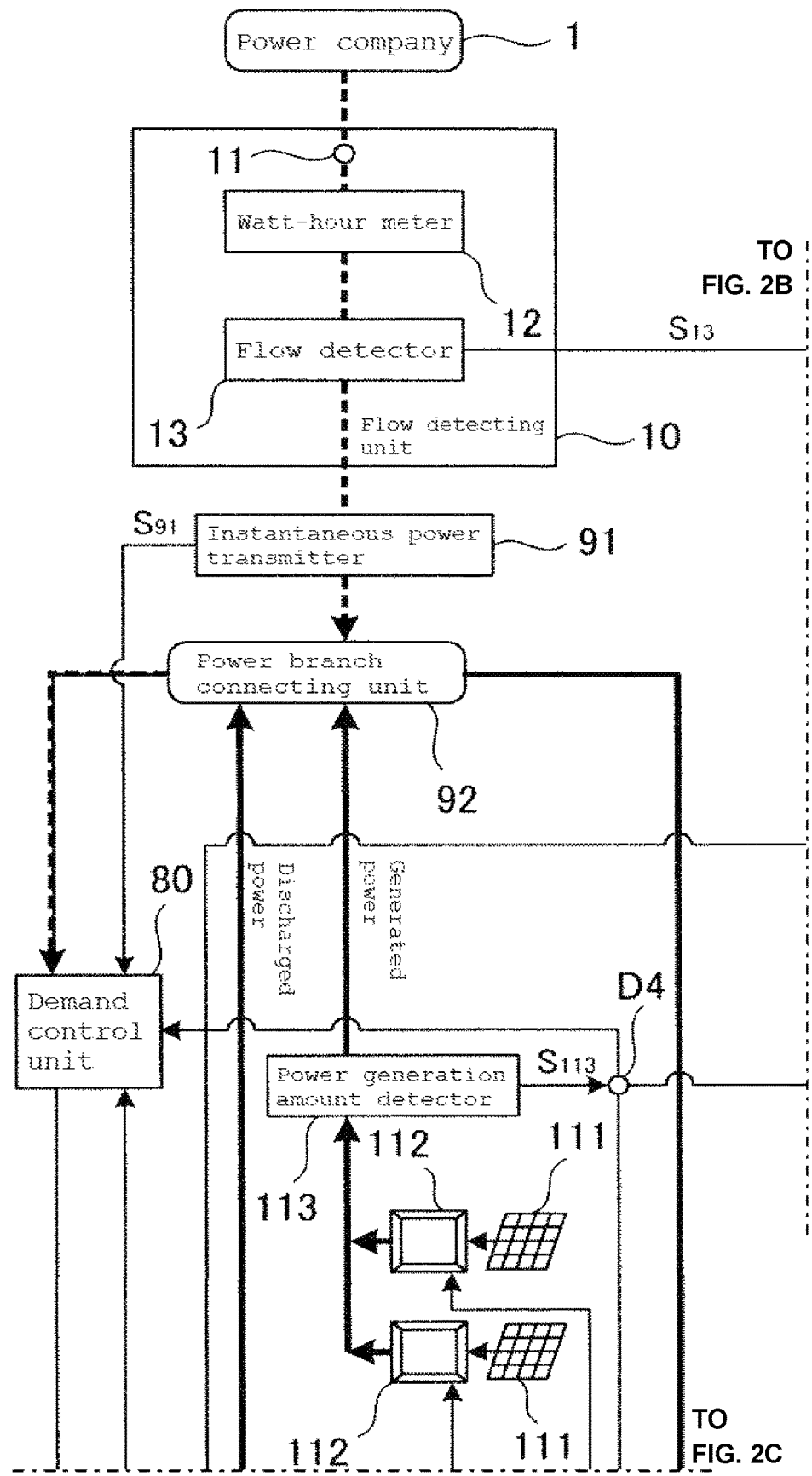
FIGS. 2A-C illustrate an explanatory diagram showing a structure related to flow control of the renewable energy power generation and storage control device for reverse flow prevention type self-consumption according to Example 1 of the present invention.
Figure 2B:
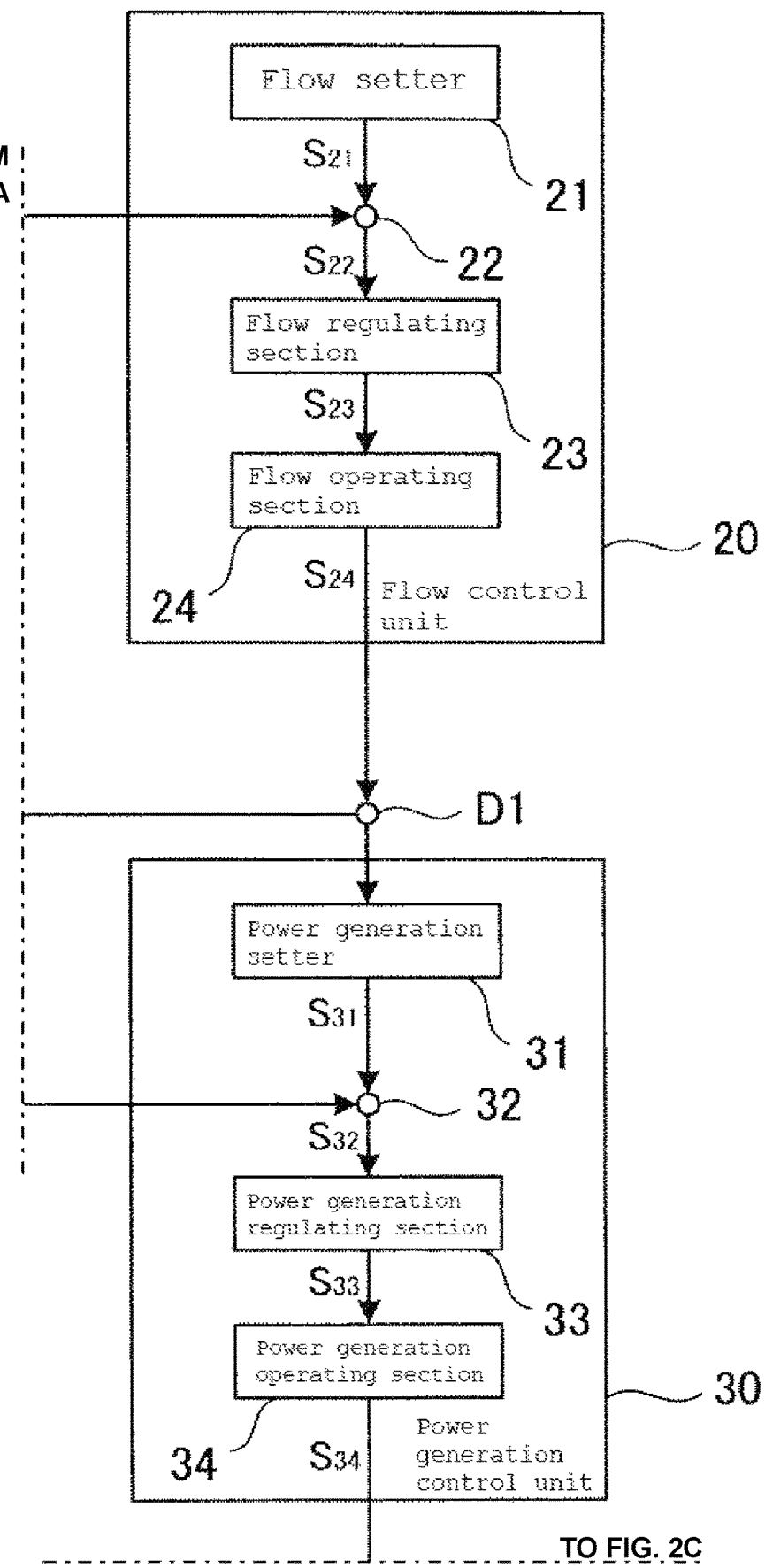
Figure 2C:
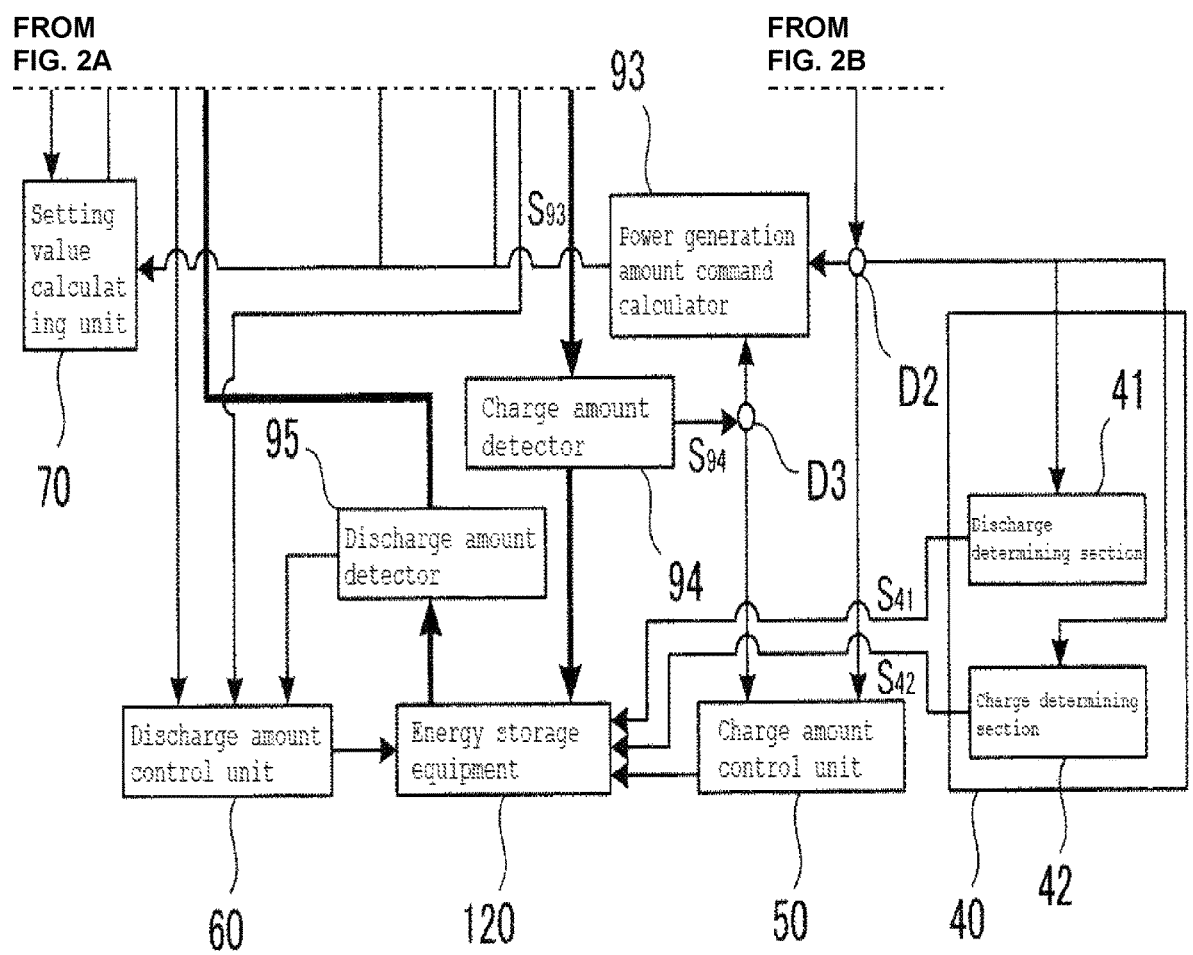

As shown in FIGS. 2A-C, the flow detecting unit 10 includes a watt-hour meter 12 that measures a flow power amount, and a flow detector 13 that outputs the result of detection of the flow power (instantaneous power) by an international standard instrumentation signal (4~20 mA DC) as a flow signal $S_{13}$. Reference sign 11 shown in FIG. 2A denotes a power receiving point.

Further, the flow control unit 20 includes a flow setter 21 that outputs a target value of the flow power as a flow target value $S_{21}$, a flow comparing section 22 that outputs the result of a comparison between the flow signal $S_{13}$ and the flow target value $S_{21}$ as a flow comparison signal $S_{22}$, a flow regulating section 23 that outputs a value according to a sensitivity K as a flow regulation signal $S_{23}$ based on the flow comparison signal $S_{22}$, and a flow operating section 24 that outputs as a flow operation signal $S_{24}$ a flow operation amount to control the flow in response to the flow regulation signal $S_{23}$.

The power generation control unit 30 includes a power generation setter 31 that sets a target value of a renewable energy power generation amount based on the flow operation signal $S_{24}$ and outputs the target value as a power generation target value $S_{31}$, a power generation comparing section 32 that outputs the result of a comparison of the power generation target value $S_{31}$ with a power generation amount signal $S_{113}$ sent from a power generation amount detector 113 to be described later as a power generation comparison signal $S_{32}$, a power generation regulating section 33 that outputs a value according to a sensitivity K as a power generation regulation signal $S_{33}$ based on the power generation comparison signal $S_{32}$, and a power generation operating section 34 that outputs as a power generation operation signal $S_{34}$ a power generation operation amount to control the power generation amount in response to the power generation regulation signal $S_{33}$.

The charge/discharge determining unit 40 includes a discharge determining section 41 having a discharge command signal generating function to discharge power stored in the energy storage equipment 120 at an appropriate timing, and a charge determining section 42 having a charge command signal generating function to automatically determine timing to charge surplus electricity of the renewable energy power generation equipment 110 on a holiday or the like when it is suppressed from power generation and to start the charging.

The renewable energy power generation equipment 110 (here, provided as photovoltaic power generation equipment of 500 kW, for example) includes solar panels 111 as power generation devices that generate electric power from sunlight, power conditioners (direct current/alternating current converters, hereinafter "power conditioners for power generation") 112 which are electric power converters that output electric power generated by the solar panels 111 by converting from a direct current to an alternating current and are each connected to each of the solar panels 111, and the power generation amount detector 113 that detects the renewable energy power generation amount and outputs it as the power generation amount signal $S_{113}$.

The flow power supplied from the power company 1 through the power receiving point 11 is measured by the watt-hour meter 12, and supplied to the on-site load 86 from the power branch connecting unit 92.

Figure 3:
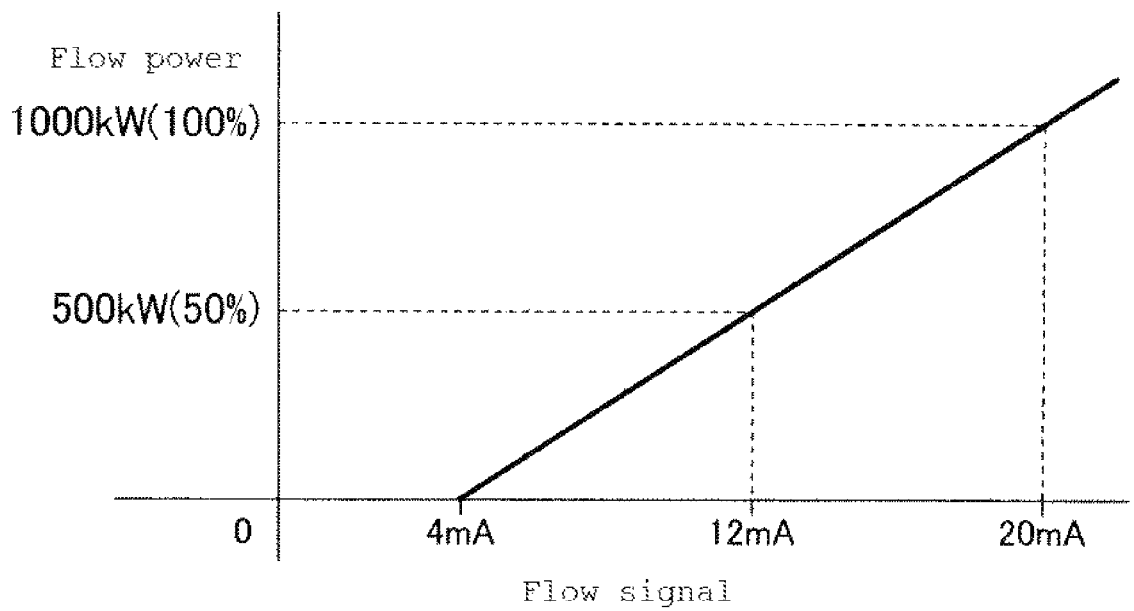
FIG. 3 is a graph showing the relationship of a flow power value and a flow signal value.

At this time, if the flow power has a maximum value of 1000 kW and a minimum value of 0 kW, the flow signal $S_{13}$ output from the flow detector 13 takes such values as shown in FIG. 3. In the present example, international standard instrumentation signals (4~20 mA DC) are used for description, however, a range configured by any one or a combination of multiple circuits out of a digital signal processing circuit, an analog signal processing circuit, a machine language processing circuit, and an electrical relay circuit is also included herein.

Here, when it is assumed that the flow power is 100 kW, a flow signal $S_{13}$ of 4+16×0.1=5.6 (mA) is output from the flow detector 13. On the other hand, when 5.6 mA equivalent to 100 kW has been set by the flow setter 21 as the flow target value $S_{21}$, a flow comparison signal $S_{22}$ of (target value−detection value (flow signal))=5.6−5.6=0 (mA) is sent from the flow comparing section 22 to the flow regulating section 23. The flow regulation signal $S_{23}$ according to the sensitivity K is thereupon sent from the flow regulating section 23 to the flow operating section 24, and the flow operation signal $S_{24}$ to control the flow is sent from the flow operating section 24 to the first branching portion D1. For example, if the sensitivity of the flow regulating section 23 is K=1, an operation signal of 4 mA as a 0%-equivalent signal is sent to the first branching section D1.

When the target value $S_{21}$ set by the flow setter 21 is equivalent to 100% of the maximum value of the flow power and the flow signal $S_{13}$ detected by the flow detector 13 is a 50%-equivalent signal, the deviation is equivalent to 50%, so that the flow regulation signal $S_{23}$ output from the flow regulating section 23 is 50×1=50(%) when the sensitivity of the flow regulating section 23 is K=1. When the sensitivity of the flow regulating section 23 is K=2, the flow regulation signal $S_{23}$ is 50×2=100(%). Likewise, when the sensitivity of the flow regulating section 23 is K=0.5, the flow regulation signal $S_{23}$ is 50×0.5=25(%), and thus appropriately adjusting the sensitivity K of the flow regulation section 23 makes it possible to perform optimal flow control.

Further, when a demand power amount by the on-site load 86 increases to 200 kw, the flow signal $S_{13}$ changes to 4+16×0.2=7.2 (mA), so that a flow comparison signal $S_{22}$ of (target value−detection value)=7.2−5.6=1.6 (mA) is sent from the flow comparing section 22 to the flow regulating section 23. Here, if the sensitivity of the flow regulating section 23 is K=1, a flow regulation signal $S_{23}$ of 1.6 mA is sent from the flow regulating section 23 as well. If the sensitivity of the flow regulating section 23 is K=2, a flow regulation signal $S_{23}$ of 3.2 mA is sent to the flow operating section 24. A flow operation signal $S_{24}$ of 4+1.6 mA=5.6 mA (a 10% increasing command with respect to the maximum value of the flow power) is sent to the power generation setter 31 from the flow operation section 24 through the first branching portion D1 when the sensitivity of the flow regulating section 23 is K=1.

The flow operation signal $S_{24}$ output from the flow operation section 24 is sent to the power generation comparing section 32 through the power generation setter 31 as the power generation target value $S_{31}$, and the result of a comparison of the power generation target value $S_{31}$ and the power generation amount signal $S_{113}$ input from the power generation amount detector 113 performed in the power generation comparing unit 32 is transmitted to the power generation regulating section 33 as the power generation comparison signal $S_{32}$. The power generation regulation signal $S_{33}$ according to the sensitivity K is thereupon sent from the power generation regulating section 33 to the power generation operating section 34, and the power generation operation signal $S_{34}$ to control the renewable energy power generation amount is sent to the power generation amount command calculator 93 through the second branching portion D2. In this regard, the power generation amount command calculator 93 outputs the power generation amount command signal $S_{93}$ as C=A+B, in which the power generation operation signal $S_{34}$ is A, the charge amount signal $S_{94}$ is B, and the power generation amount command signal $S_{93}$ is C. Namely, the power generation amount command calculator 93 adds a power generation operation signal and a storage battery charging power signal input from the charge amount detector 94 described above together and sends the sum to the power conditioners for power generation 112 as the power generation amount command signal C. The renewable energy power generation amount is thereby controlled, and the renewable energy power generation amount detected by the power generation amount detector 113 is input to the power generation comparing section 32 as the power generation amount signal $S_{113}$ through the branching portion D4.

Figure 4:
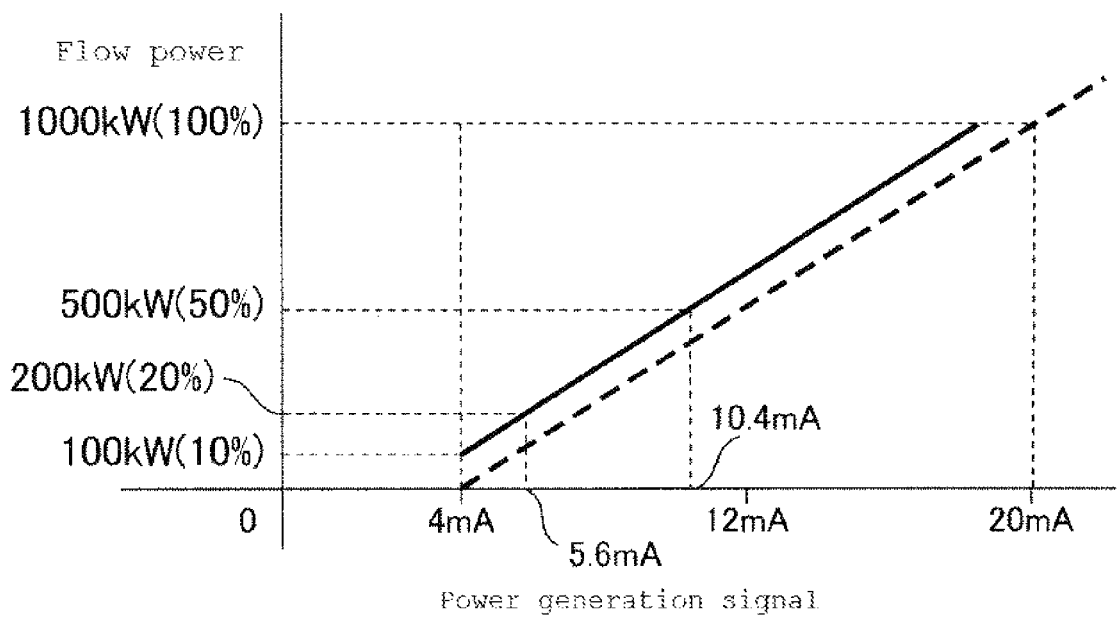
FIG. 4 is a graph showing the relationship of the flow power value and a power generation signal value.

Here, the device is configured so that generating power setting value=flow power−100 kW in the present example. Specifically, as shown in FIG. 4, in the present example, because the target value $S_{21}$ is 100 kW when the flow power is 0~100 kW, 4 mA (equivalent to 0 kW) is sent as the power generation operation signal $S_{24}$ from the flow operating section 24, and generated renewable energy power is controlled to 0 kW. The minimum value of the flow power can thereby be always maintained to be 100 kW or more so as to prevent a reverse flow due to a sudden decrease in the demand power amount. This will be described later in detail.

Further, by adjusting in advance the sensitivity K of the flow regulating section 23 or the like so that the flow operation signal $S_{24}$ that is sent from the flow operating section 24 to the power generation setter 31 slowly rises from 4 mA to 5.6 mA (equivalent to 100 kW) in a case where the flow power temporarily is 200 kW due to an increase in the demand power amount, the generated renewable energy power is controlled by the power generation control unit 30 so as to gradually rise toward 100 kW. An element of integral control is also used at this time so that while the flow power decreases toward 100 kW with the increase in generated renewable energy power, the flow operation signal $S_{24}$ to be output from the flow operating section 24 remains increased and is stabilized.

Figure 5:
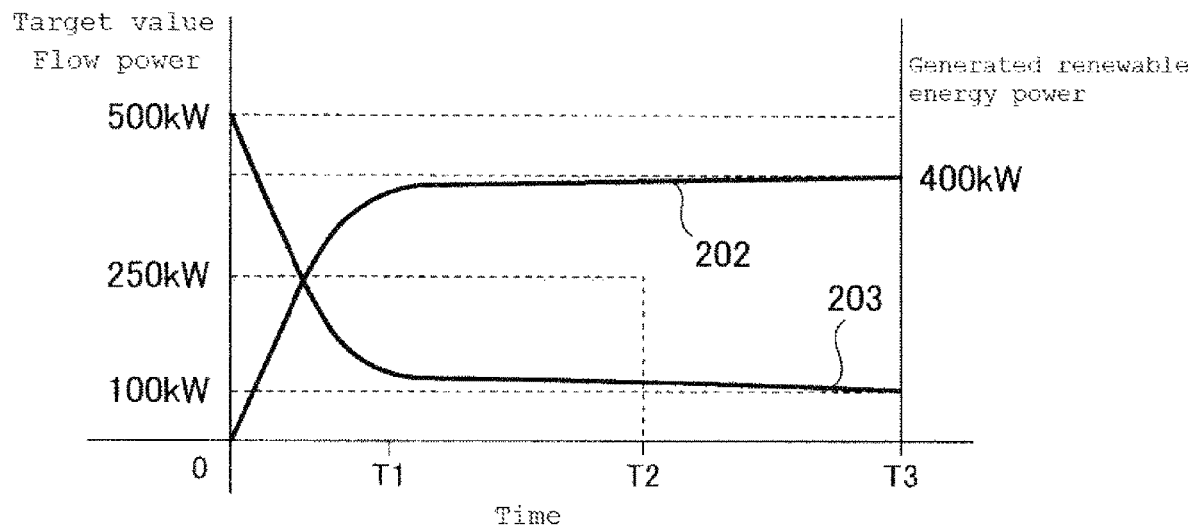
FIG. 5 is a graph showing temporal changes of the flow power value and a generated renewable energy power value.

Moreover, as shown in FIG. 5, by sending a flow operation signal $S_{24}$ of 10.4 mA (equivalent to 400 kW) from the flow operation section 24 to the power generation setter 31 when the flow power rises to 500 kW, the generated renewable energy power is controlled by the power generation control unit 30 so as to gradually rise to 400 kW.

A method for controlling the entirety by thus using a first-stage control signal (here, the flow operation signal $S_{24}$) as a setting value of a second-stage control unit (here, the power generation control unit 30) is called cascade control. In the flow cascade control using renewable energy power generation of the present example, the flow control unit 20 controls the generated renewable energy power (example: 0~500 kW) by detecting the flow operation signal $S_{24}$ as a control amount of the flow with respect to the flow target value $S_{21}$ (example: 100 kW) while setting this flow operation signal $S_{24}$ as the target value of the power generation control unit 30 so as to perform flow control of the entirety.

Next, the concept of flow power will be described.

Figure 6:
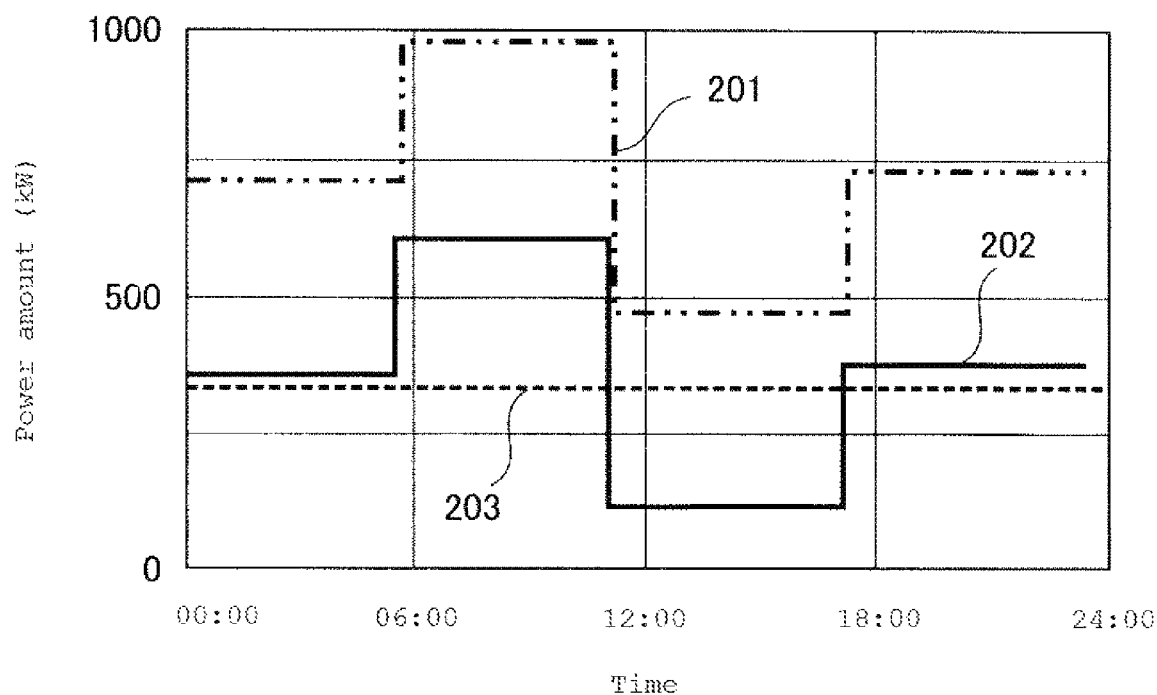
FIG. 6 is a graph conceptually showing the relationship of flow power and self-generated power on weekdays.

In FIG. 6, reference sign 201 denotes a value of the demand power amount, 202 denotes a value of the power generation amount, and 203 denotes a value of the flow power. The value of the flow power 203 is the difference between the value of the demand power amount 201 and the value of the power generation amount 202 and is therefore represented by a straight line. It can be understood from FIG. 6 that the flow power 203 can be suppressed to achieve a reduction in electricity rates by performing appropriate power generation on-site.

Figure 7:
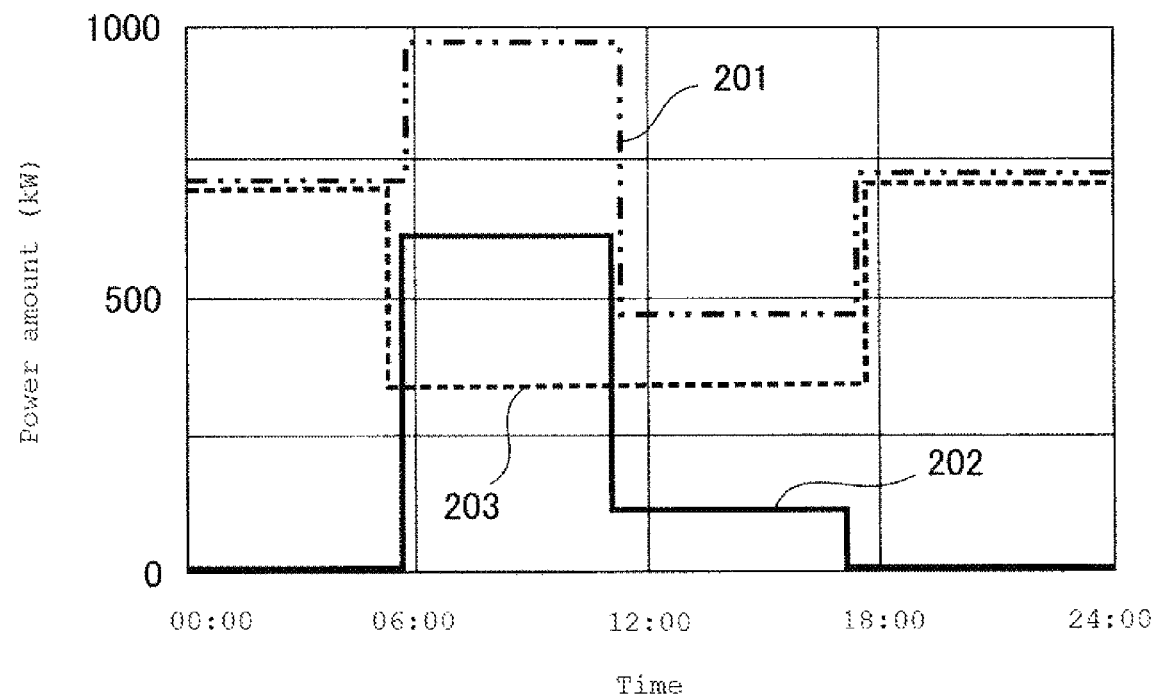
FIG. 7 is a graph conceptually showing the relationship of flow power and photovoltaic generated power on weekdays.

Here, when the renewable energy power generation equipment 110 by photovoltaic power generation is applied as the power generation equipment as in the present example, the power generation equipment does not generate power before daylight and during the nighttime and when the weather is cloudy, so that the demand power amount 201, the power generation amount 202, and the flow power 203 have such a relationship as shown in FIG. 7, for example. Even in such a case, a stable flow power control is possible by controlling the generated renewable energy power by detecting the flow operation signal $S_{24}$.

Description will be given on whether or not flow control is carried out in the present example by use of FIG. 8 and FIG. 9.

Figure 8:
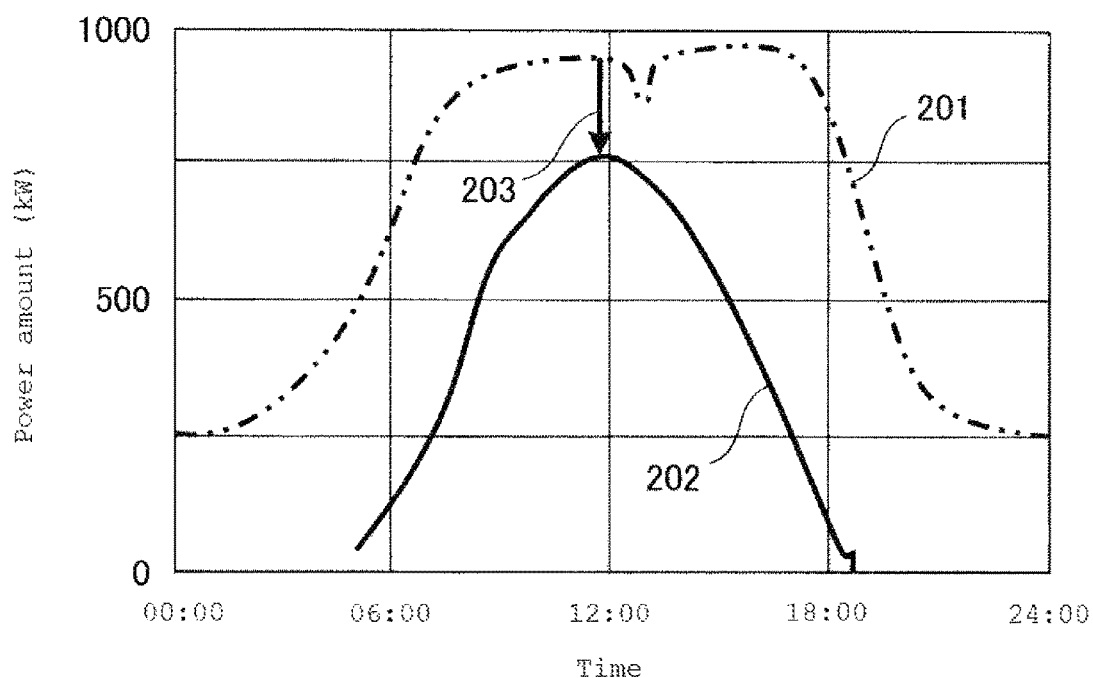
FIG. 8 is a graph conceptually showing the relationship of a demand power amount and a photovoltaic power generation amount on a sunny weather day and under a high load.

As shown in FIG. 8, under a high load when the demand power amount by the on-site load 86 is great, such as on a weekday, the flow control is not performed because the power generation mount 202 is smaller than the demand power amount 201. However, it is possible to perform the flow control to prevent a reverse flow when the demand power amount 201 is smaller than the power generation amount 202 for some conditions.

Figure 9:
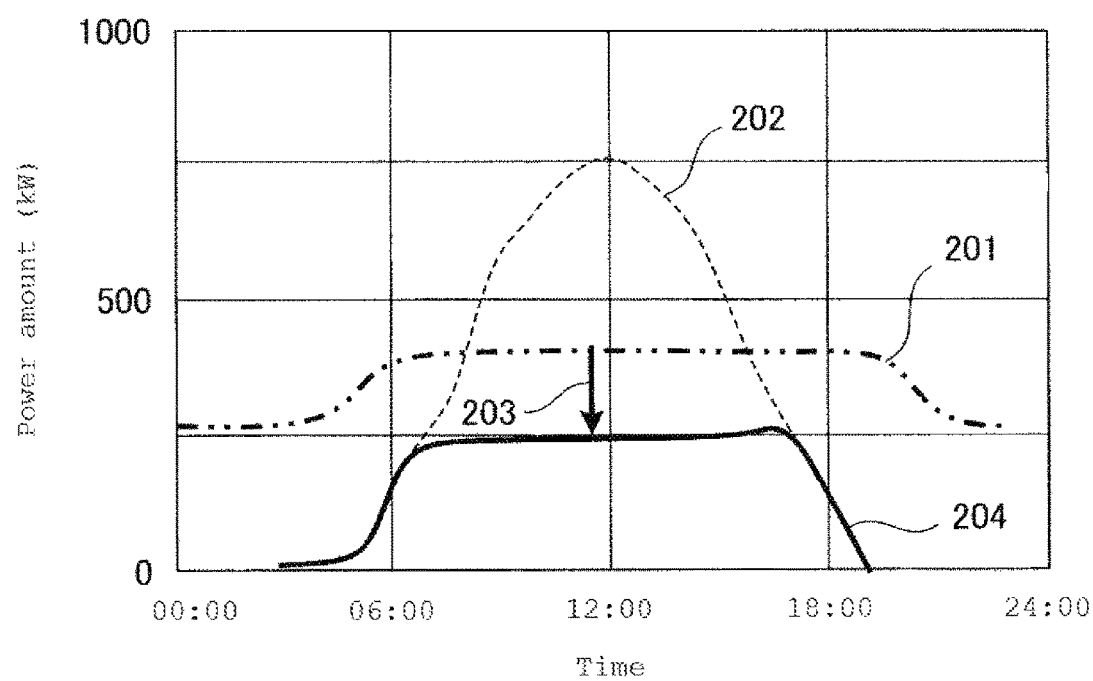
FIG. 9 is a graph showing the relationship of the demand power amount and the photovoltaic power generation amount on a sunny weather day and under a low load.

On the other hand, as shown in FIG. 9, under a low load, such as on a holiday, when the demand power amount by the on-site load 86 is small compared with on weekdays, the flow control is performed because the demand power amount 201 is small relative to the amount of power that can be generated by the renewable energy power generation equipment 110. As shown in FIG. 9, generated renewable energy power 204 thus is small relative to the demand power amount 201.

Subsequently, description will be given of changes in flow power amount and the flow target value $S_{21}$ by use of FIG. 5. In the example shown in FIG. 5, after the flow power is increased to 500 kW by an increase in the demand power amount, the flow power is suppressed to 100 kW by an increase in generated renewable energy power. Although FIG. 5 shows an example in which base flow power of 100 kW is always introduced (purchased) at a minimum so that a reverse flow does not occur due to a sudden decrease in the demand power amount, a setting value of the base flow power differs according to a maximum value of the demand power amount and a power amount that possibly suddenly decreases due to a controllable load 86A (see FIGS. 15A-C).

The generated renewable energy power (example: 250 kW) differs depending on the status of the on-site load 86, but in the present example, it is automatically set by the flow operating section 24 of the flow control unit 20. Accordingly, until a demand power amount exceeds 600 kW, the flow power amount is suppressed to 100 kW, and when the generated renewable energy power is 250 kW, 350 kw obtained by adding thereto the flow power of 100 kW is on-site load power. If a load of 1000 kW is generated on-site, flow power of (demand power amount−maximum renewable energy power generation amount)=1000 kW−500 kW=500 kW is suppled. On the other hand, when the on-site load power is 100 kW, the generated renewable energy power is 0 kW, and the flow is 100 kW. This flow control can prevent the generated renewable energy power from reversely flowing to the power grid 1a side even when the on-site load power suddenly decreases.

Figure 10:
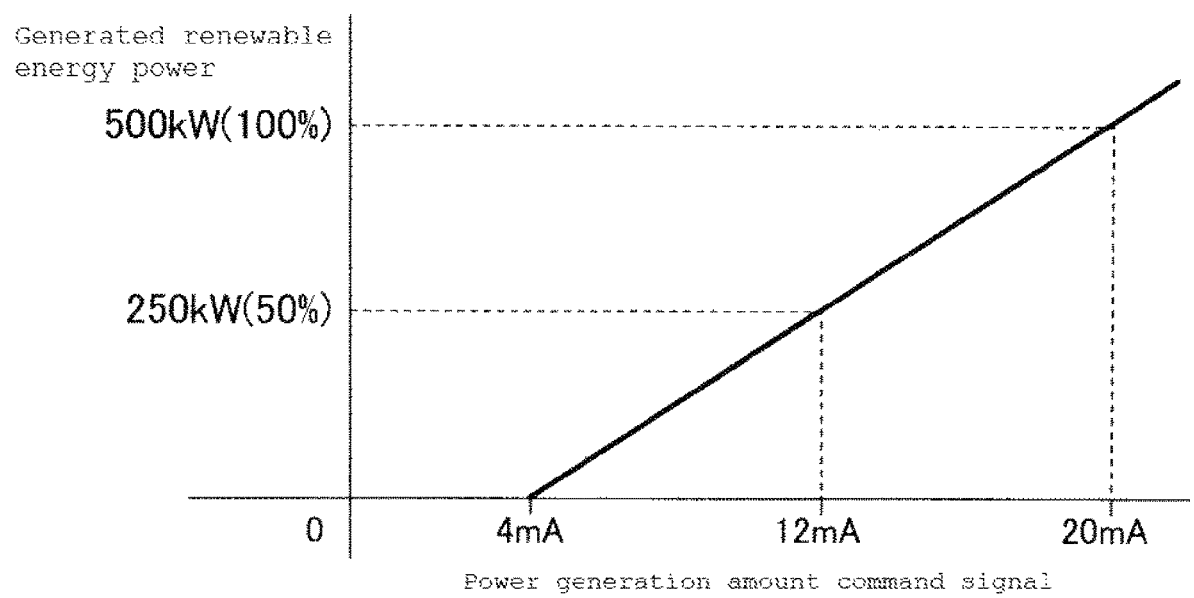
FIG. 10 is a graph showing the relationship of a generated renewable energy power amount and a power generation amount command signal value.
Figure 11A:
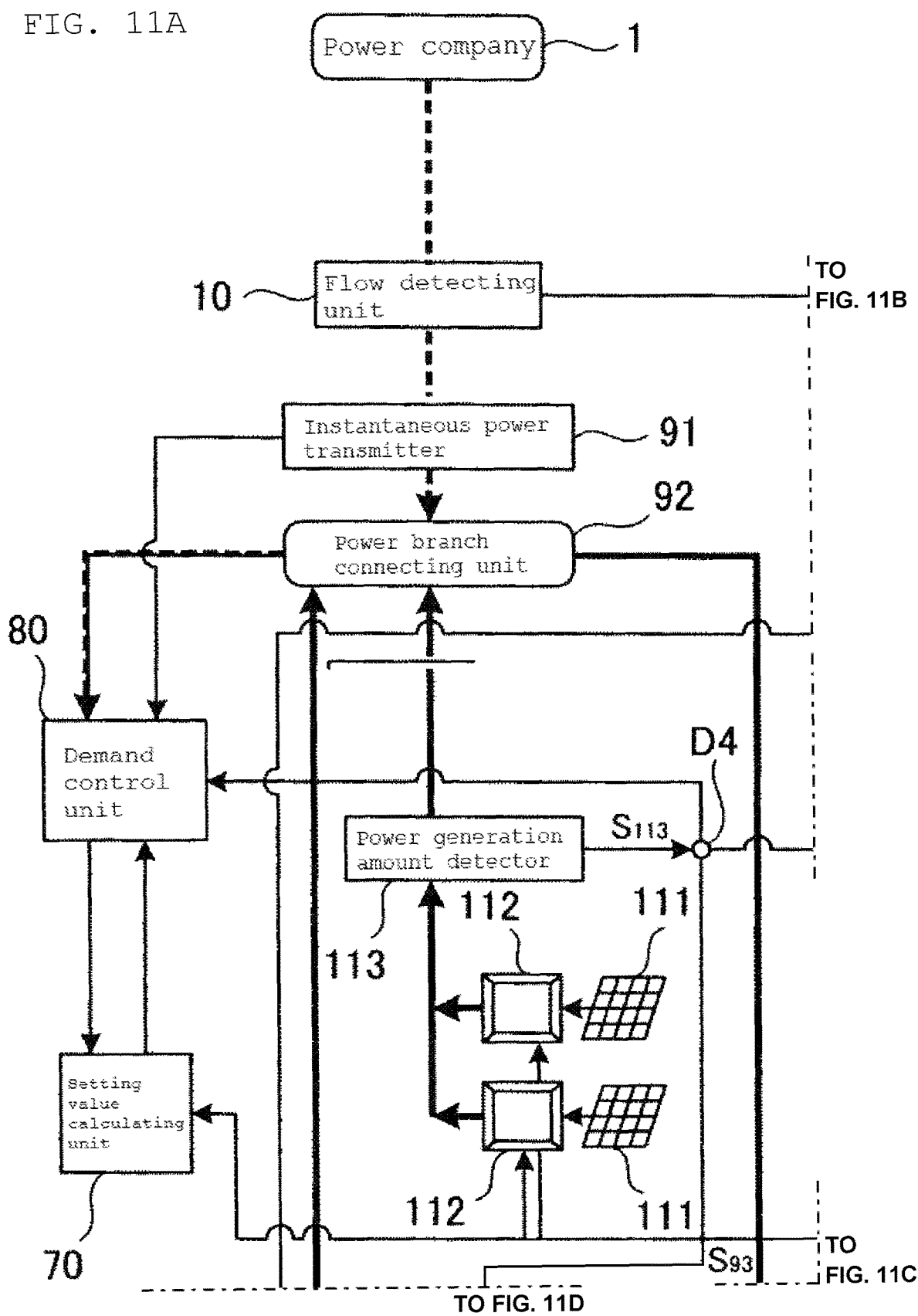
FIGS. 11A-D illustrate an explanatory diagram showing a structure related to charge and discharge control of the renewable energy power generation and storage control device for reverse flow prevention type self-consumption according to Example 1 of the present invention.
Figure 11B:
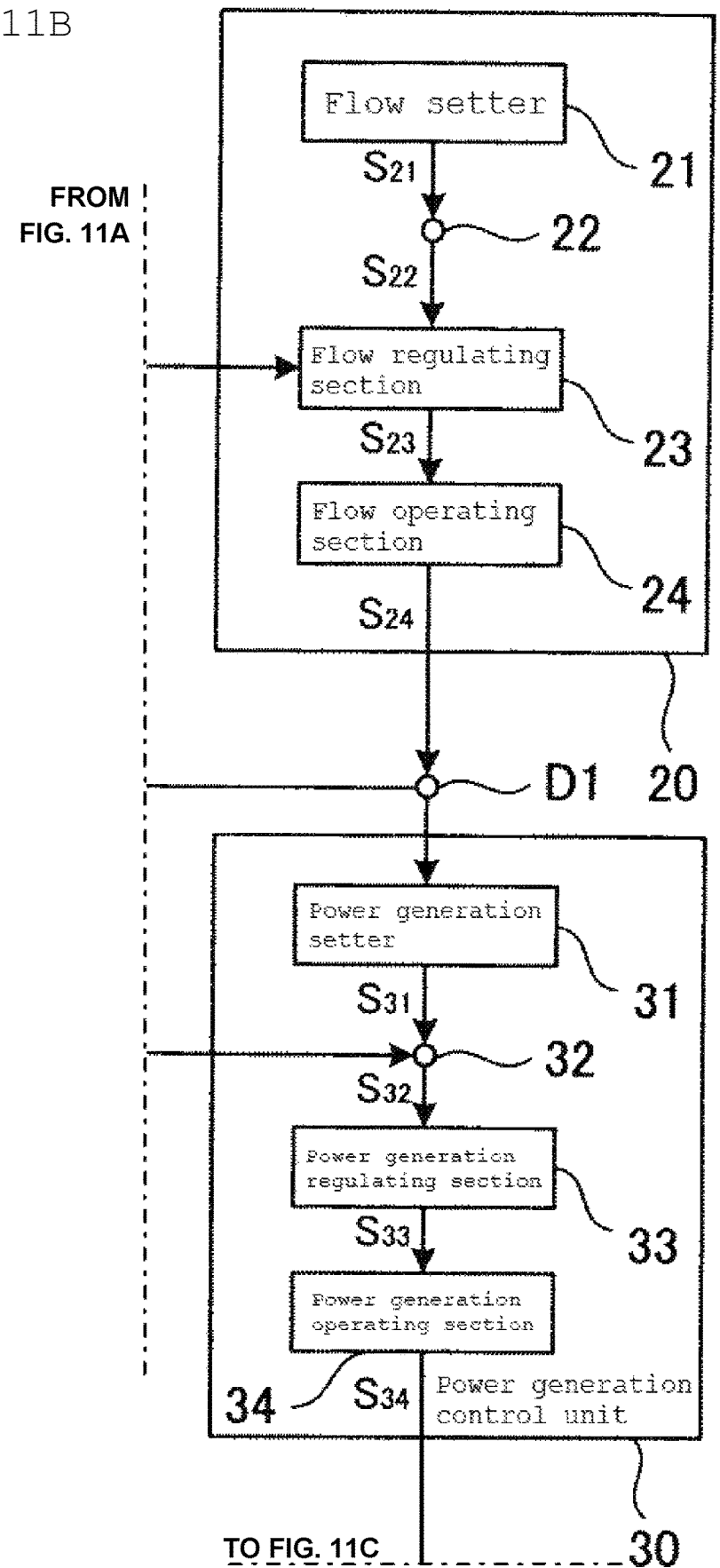
Figure 11C:
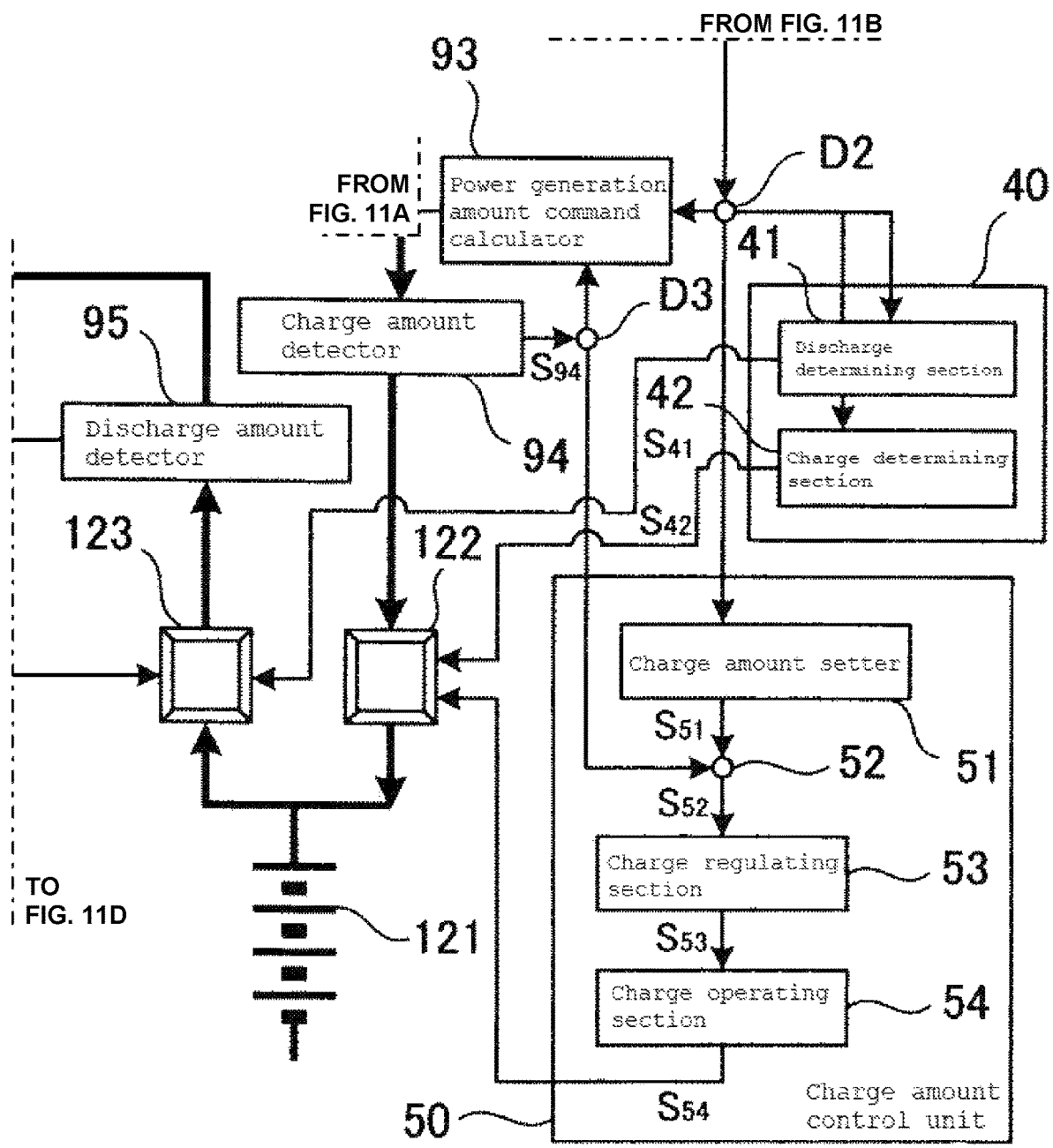
Figure 11D:
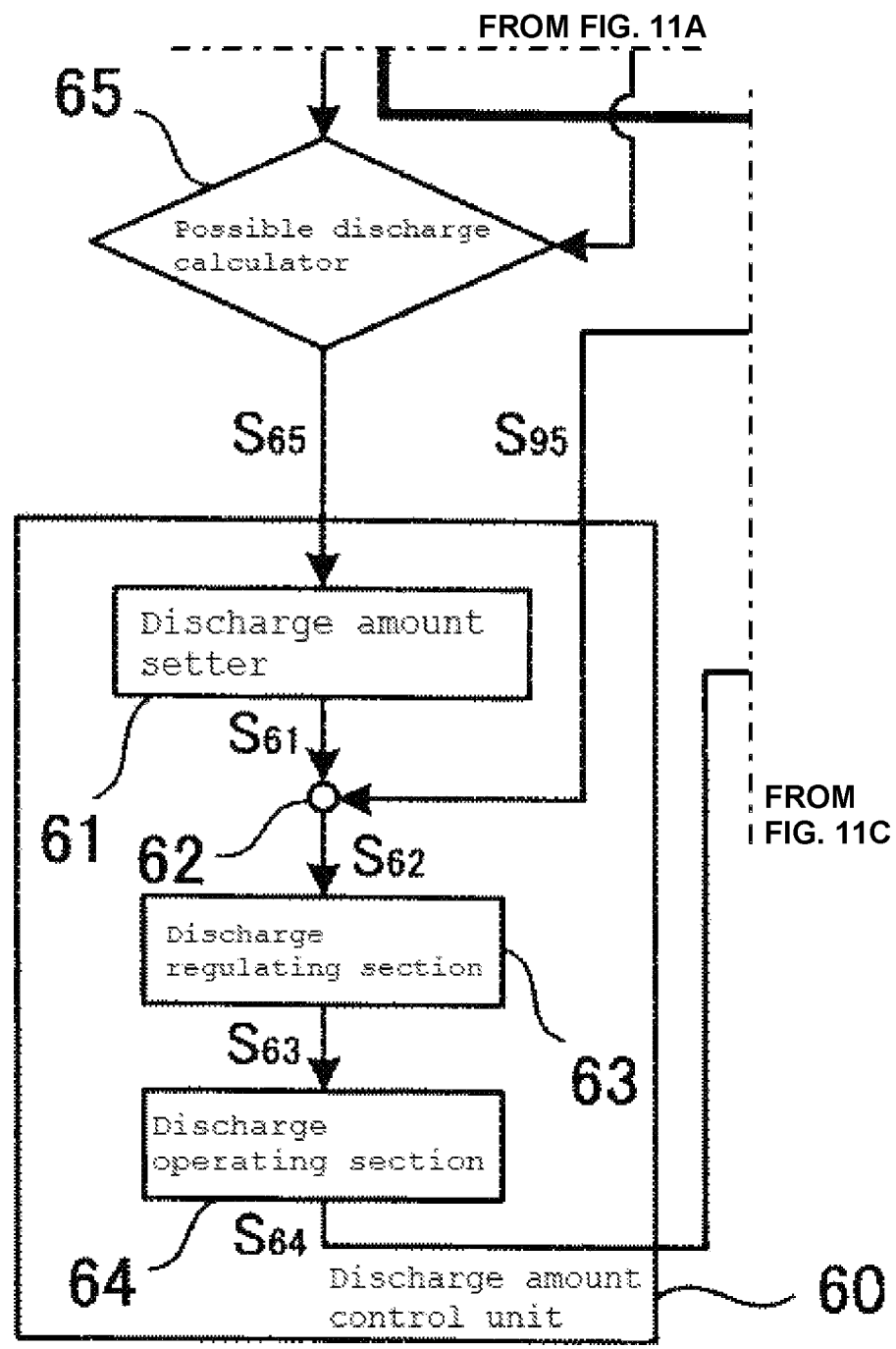

For example, in a case where the amount of solar radiation is maximum, as shown in FIG. 10, when 4 mA (0%) is input as the power generation amount command signal $S_{93}$ to the power conditioners for power generation 112 from the power generation amount command calculator 93, generated renewable energy power of 0 kW is output from the power conditioners for power generation 112. When 20 mA is input as the power generation amount command signal $S_{93}$ to the power conditioners for power generation 112, generated renewable energy power of 500 kW is output from the power conditioners for power generation 112.

In such manner as above, by the flow control using renewable energy power generation of the present example, the renewable energy power generation equipment 110 can be stably operated without causing the generated renewable energy power on-site to affect the power grid 1a by preventing a reverse flow. Accordingly, many renewable energy power generation equipment 110 can be installed even in the future when the "renewable energy output suppression regulations" are implemented, which can thus contribute to global environment protection by reduction of carbon dioxide, as well.

<Energy Storage Charge and Discharge Control>

Next, description will be given of the charge and discharge control of energy storage in the present example by use of FIGS. 11A-D to FIG. 14.

As shown in FIGS. 11A-D, the charge amount control unit 50 includes a charge amount setter 51 that sets a target value of the charge amount based on the power generation operation signal $S_{34}$ and outputs the target value as a charge amount target value $S_{51}$, a charge amount comparing section 52 that outputs the result of a comparison of the charge amount target signal $S_{51}$ with the charge amount signal $S_{94}$ sent from the charge amount detector 94 as a charge comparison signal $S_{32}$, a charge regulating section 53 that outputs a value according to a sensitivity K as a charge regulation signal $S_{53}$ based on the charge comparison signal $S_2$, and a charge operating section 54 that outputs as a charge operation signal $S_{34}$ a charge operation amount to control the charge amount in response to the charge regulation signal $S_{33}$.

The discharge control unit 60 includes a discharge amount setter 61 that sets a target value of the discharge amount based on a discharge amount signal $S_{63}$ sent from a possible discharge calculator 65 to be described later and outputs the target value as a discharge target value $S_{61}$, a discharge amount comparing section 62 that outputs the result of a comparison of the discharge target value $S_{61}$ with the discharge amount signal $S_{93}$ sent from the discharge amount detector 95 as a discharge comparison signal $S_{62}$, a discharge regulating section 63 that outputs a value according to a sensitivity K as a discharge regulation signal $S_{63}$ based on the discharge comparison signal $S_{62}$, and a discharge operating section 64 that outputs as a discharge operation signal $S_{64}$ a discharge operation amount to control the discharge amount in response to the discharge regulation signal $S_{63}$. Further, the possible discharge calculator 65 determines whether or not discharge is possible based on the flow operation signal $S_{24}$ sent through the branching portion D1 and the power generation amount signal $S_{113}$ sent through the branching portion D4, and sends the flow operation signal $S_{24}$ to the discharge amount setter 61 when discharge is possible.

The energy storage equipment 120 includes a storage battery 121 as a storage device, a power conditioner (an alternating current/direct current converter, hereinafter "power conditioner for power charge") 122 which is an electric power converter that outputs the electric power supplied from the power branch connecting unit 92 by converting from an alternating current to a direct current and is connected to the storage battery 121, and a power conditioner (a direct current/alternating current converter, hereinafter "power conditioner for power discharge") 123 which is an electric power converter that outputs the electric power stored in the storage battery 121 by converting from a direct current to an alternating current and is connected to the storage battery 121.

First, in a case such that the renewable energy power generation amount by the renewable energy power generation equipment 110 is larger than the demand power amount due to weather conditions under a low load (for example, a demand power amount of 400 kW) such as on a weekday, the power company 1 may demand suspension of renewable energy power generation in order to prevent a reverse flow. On the other hand, by performing the charge and discharge control of the energy storage equipment 120 in the present example, it is possible to control and suppress generated renewable energy power so as not to cause a reverse flow and to store the suppression power in the storage battery 121, so that it is no longer necessary to perform the suspension of renewable energy power generation.

Hereinafter, description will be given of a storage battery charge start determining function in the present example. The example shown in FIG. 9 shows a situation in which the generated renewable energy power 204 is controlled to be within the demand power amount 201 in order to prevent reverse flow power. The value of the power generation operation signal $S_{34}$ that is sent at that time from the power generation operating section 34 to the renewable energy power generation equipment 110 is shown by an alternate long and short dashed line in FIG. 12. The amount of solar radiation is small in early morning (until approximately 06:00) shown at the left hand side and the power generation operation signal $S_{34}$ is therefore sent at approximately 100%, however, when daytime approaches, the power generation operation signal $S_{34}$ decreases in order to suppress the power generation amount. At this time, by electrically capturing the decreased power generation operation signal $S_{34}$ by the charge/discharge determining unit 40, being in "a renewable energy surplus electricity state (a state in which the renewable energy power generation amount is larger than the demand power amount)" can be sensed. A charge command signal $S_{42}$ is then sent from the charge determining section 42 to the power conditioner for power charge 122, and charge into the storage battery 121 is thereby automatically started. In order to stabilize the automatic charging function, the charge determining section 42 is provided with a hysteresis amount to some extent (approximately 2 to 10%). For the sake of operation, the power conditioner for power charge 122 and the power conditioner for power discharge 123 are sometimes prepared in an integrated manner as a power conditioner for a storage battery, however, in the present example, the power conditioners are described in a divided manner in order to clarify the technical contents.

Subsequently, description will be given of a storage battery discharge start determining function in the present example.

Figure 12:
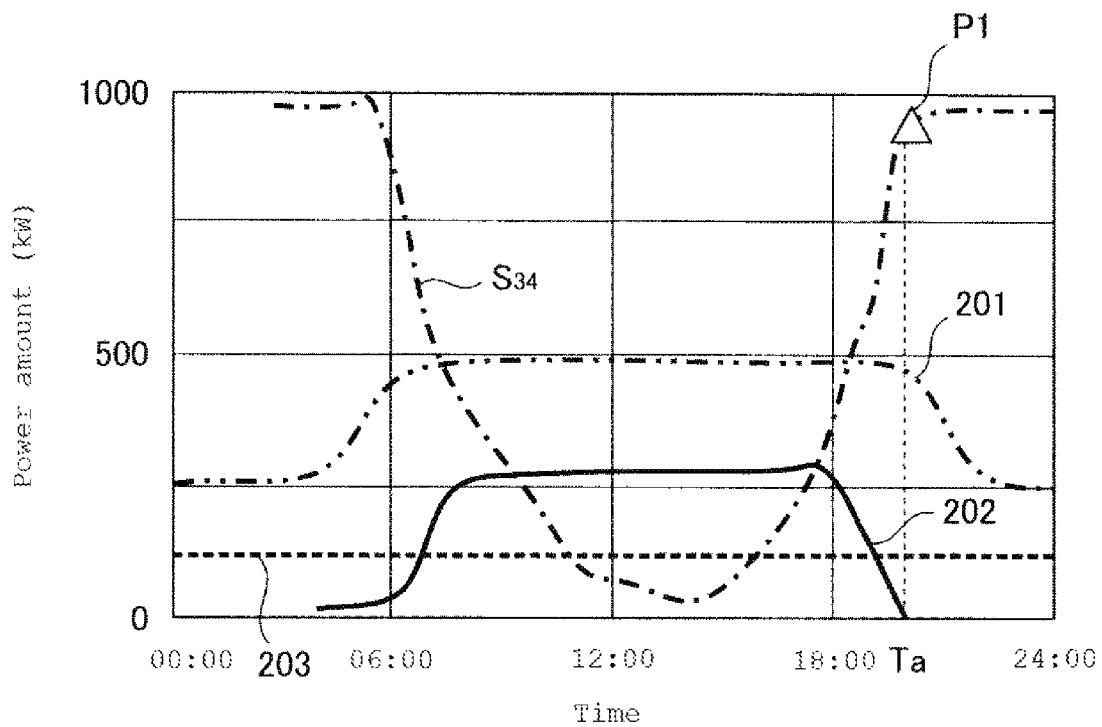
FIG. 12 is a graph showing the relationship of a conventional demand power amount, a conventional generated renewable energy power amount, and a conventional flow power amount under a low load.

In the same manner as the storage battery charge start determining function, the power generation operation signal $S_{34}$ sent from the power generation operating section 34 to the renewable energy power generation equipment 110 is detected by the charge/discharge determining unit 40. As shown in FIG. 12, when a point at which the power generation operation signal $S_{34}$ sent to the renewable energy power generation equipment 110 is the maximum after rising is provided as P1, this point P1 indicates that the amount of solar radiation is small because of nighttime or cloudy weather although the signal is being sent so as to increase the renewable energy power generation amount, and therefore, the most efficient operation is to use the renewable energy having been stored in the storage battery 121 at this timing. Then, a discharge (recharge) command signal $S_{41}$ is sent from the discharge determining section 41 to the power conditioner for power discharge 123, and discharge from the storage battery 121 is thereby automatically started. In order to stabilize the automatic charging function, the discharge determining section 41 is also provided with a hysteresis amount to some extent (approximately 2 to 10%) to stabilize operation.

Unlike general storage battery equipment, it is required for the energy storage equipment 120 to discharge energy storage as quickly as possible and maintain an empty (waiting for charging) state in preparation for next charging to the extent possible in terms of characteristics. In response, the storage battery discharge start determining function described above is a technique effective for realizing these characteristics.

Next, description will be given of a storage battery charging rate control function in the present example.

For a storing rate of the storage battery 121 as well, it is preferable to automatically set only surplus electricity of the renewable energy power generation equipment 110 according to the surplus state. Namely, the charge amount (charging rate) is controlled depending on a numerical value (renewable energy control signal example: e.g. a 20% signal, 30%, etc.) of the status of surplus electricity. This is for making it possible to increase the charging rate and store a lot of renewable energy when the surplus electricity is great and to perform charging at a low charging rate when the surplus electricity is small. Such a storage battery charging rate control function enables stable charging within the range of renewable energy surplus electricity.

Figure 13:
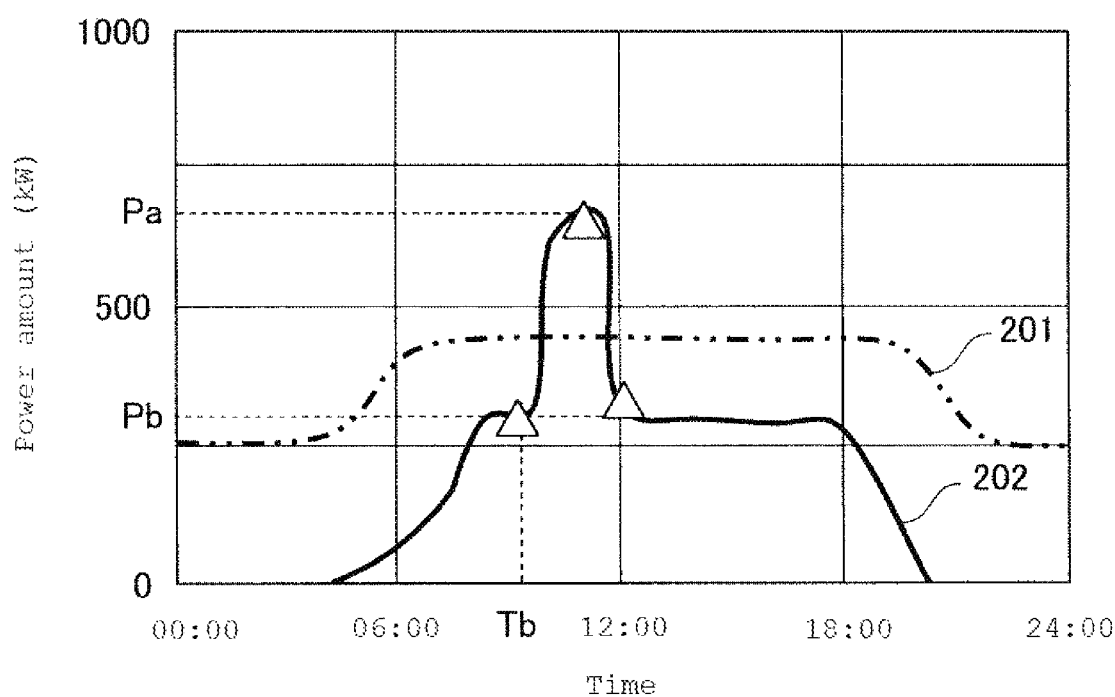
FIG. 13 is a graph showing the relationship of the demand power amount and the generated renewable energy power amount under a low load in a case where the present example is applied.
Figure 14:
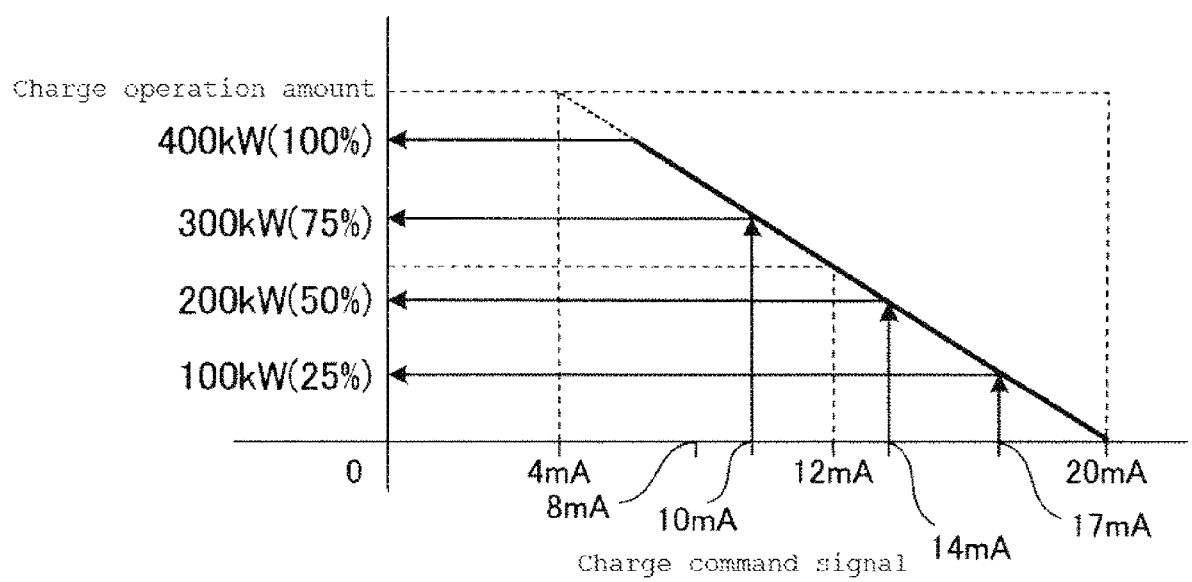
FIG. 14 is a graph showing the relationship of a charge operation amount and the power generation amount command signal value.

In a case where the photovoltaic power generation amount is changed to store surplus electricity into the storage battery 121, for example, as shown in FIG. 13, the power generation amount 202 is lower than the demand power amount 201 until time Tb, but once charging is started at time Tb, the renewable energy power generation amount rises to Pa that is higher than the demand power amount 201. When the charging into the storage battery 121 is then completed, the renewable energy power generation amount decreases because charging power decreases, and thereafter, normal power generation amount control follows so that a reverse flow does not occur.

Because the power generation operation signal $S_{34}$ from the power generation operating section 34 and the charge amount signal $S_{94}$ from the charge amount detector 94 are added together as A+B=C and output as the power generation amount command signal $S_{93}$ by the power generation amount command calculator 93, charging of surplus electricity of the renewable energy power generation into the storage battery 121 does not affect flow control.

More specifically, as shown in FIGS. 11A-D, when the power generation operation signal $S_{34}$ from the power generation operating section 34 is input to the charge determining section 42 and the charge amount control unit 50 and the charge operation signal $S_{34}$ from the charge operating section 54 and the charge command signal $S_{42}$ from the charge determining section 42 are input to the power conditioner for power charge 122, the power conditioner for power charge 122 increases the charge amount gradually. For example, in the example shown in FIG. 14, charging of approximately 100 kW is performed when the charge operation signal $S_{54}$ is approximately 17 mA. Likewise, when the charge operation signal $S_{54}$ is approximately 14 mA, charging of approximately 200 kW is performed, and when the charge operation signal $S_{54}$ is approximately 10 mA, charging of approximately 300 kW is performed. In this regard, the power conditioner for power charge 122 reduces the charge amount according to conditions such as the capacity of the storage battery 121 and completes the charging.

By performing such control, even in the case of photovoltaic power generation and the like, it is possible to store only surplus electricity during the daytime on a holiday or the like when power load is small and the amount of solar radiation is large.

Next, description will be given of a storage battery discharging rate control function in the present example.

As described above, in the case of discharging as well, it is necessary to perform discharging automatically and quickly as well as within a range that a reverse flow does not occur in a status where the renewable energy power generation equipment 110 is not in operation. Here, the discharge (recharge) command signal $S_{41}$ from the discharge determining section 41 is sent to the power conditioner for power discharge 123 when the power generation operation signal $S_{34}$ sent from power generation operating section 34 is nearly 100% (for example, 90%), the upper limit. In this case as well, a reverse flow occurs when discharged power is greater than the demand power amount, and therefore, a discharge amount (discharging rate) is controlled so as to prevent the reverse flow.

For attaining the reverse flow prevention, the possible discharge calculator 65 sends the flow operation signal $S_{24}$ from the flow operating section 24 to the discharge amount setter 61 as the discharge amount signal $S_{63}$ only when it has been detected by the power generation amount detector 113 that renewable energy power generation is not being performed. Here, in the possible discharge calculator 65, the discharge amount signal $S_{63}$ is determined by performing the following calculation so as not to perform discharging from the storage battery 121 when renewable energy power generation is being performed.

Namely, the possible discharge calculator 65 performs the following calculation, in which the flow operation signal $S_{24}$ is A', the power generation amount signal $S_{113}$ is B', and the discharge amount signal (discharge amount value) $S_{65}$ is C'.

$$C'=A'(B'=0)$$

$$C'=0(B'>0)$$

Therefore, from the viewpoint of the flow control unit 20, the discharge amount control unit 60 is regarded as a power generating element as with the power generation amount control unit 30. And, the difference therebetween is determined by distinguishing whether or not power generation is being performed by the renewable energy power generation equipment 110. Therefore, as a result, by controlling the discharge amount from the storage battery 121 only in a state where power generation is being performed by the renewable energy power generation equipment 110, an efficient discharging operation of the storage battery 121 by the flow control unit is possible.

Subsequently, brief description will be given of the grid-interconnection technology by use of FIG. 20 to FIG. 23.

Figure 20:
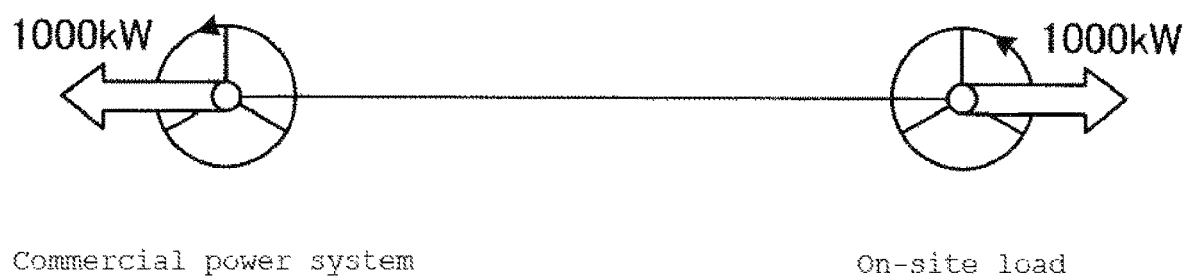
FIG. 20 is an explanatory view showing an image of interconnected operation of commercial power system-side supplying flow and on-site load-side flowing-in flow under a general load of 1000 kW.
Figure 21:
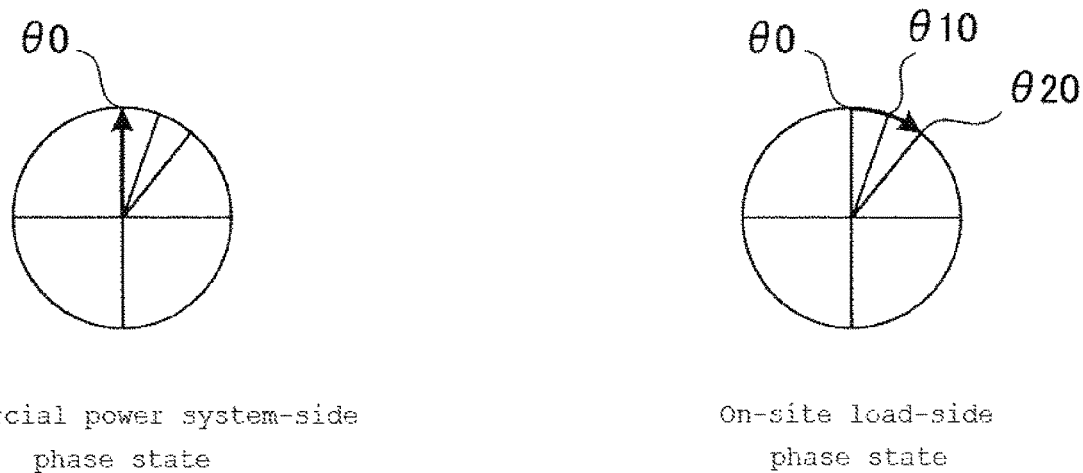
FIG. 21 is an explanatory view showing a phase delay of the on-site load-side flowing-in flow with respect to a phase of the commercial power system-side supplying flow.

FIG. 20 shows an image of interconnection operation under a general load of 1000 kW, in which the supply side (flow power of the commercial power system) is a synchronous power generator, and the on-site load side is a synchronous motor. The supply side and the load side are the same in frequency, but as shown in FIG. 21, when the phase of the supply side is provided as a reference ($\theta=0$) and the phase of the load side under a load of 500 kW is $\theta=10$, the phase of the load side under a load of 1000 kW is expressed as $\theta=20$. That is, a phase delay of the load side increases with the increase in load. Although the phase delay under 1000 kW is expressed as $\theta=20$ for the sake of description in FIG. 21, an actual phase delay is merely just a few degrees. In addition, it may be considered that the load side has a regenerative voltage slightly lower than the voltage of the supply side, and flow power flows in by that much.

Figure 22:
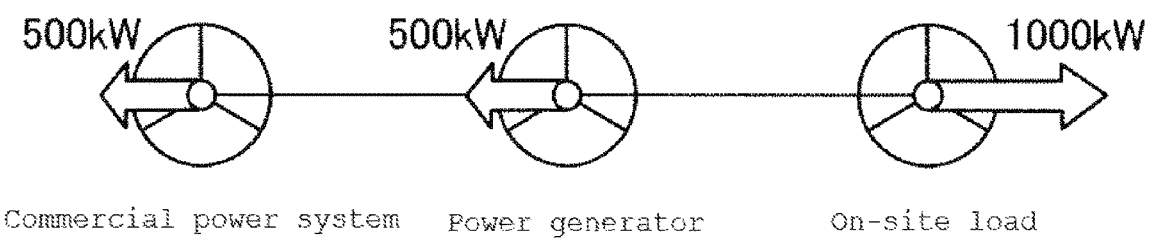
FIG. 22 is an explanatory view showing an image of interconnected operation by a commercial power system and an internal combustion engine type power generator.

FIG. 22 shows an image of power generator interconnection operation under a general load of 1000 kW.

In the state shown in FIG. 22, when an internal combustion engine type power generator is provided on-site and power of 500 kW is supplied therefrom to a load of 1000 kW, a power balance is maintained by a supply of 500 kw from the commercial power system side as well.

However, if the internal combustion engine type power generator is suspended during interconnected operation, the synchronous power generator serves as a synchronous motor and keeps its rotation in a phase delayed manner. Next, when power generation by the internal combustion engine type power generator is started to increase power output, the phase of the internal combustion engine type power generator side begins to advance, and at a point in time where the phase is the same as that of the system side, the flow power is zero. When the output of the internal combustion engine type power generator is further increased, a state (reverse flow) in which power is sent to the commercial power system side is reached.

Namely, making the output of the internal combustion engine type power generator large can resultingly make the power to be supplied from the commercial power system side small. A series of these operations is called flow control operation by an internal combustion engine type power generator, and there are a large number of working examples and actual results. By this interconnected operation method, it is possible even with the renewable energy power generation equipment 110 to likewise perform the flow control, and this is operated by the power conditioners for power generation 112 described above. The present example realizes the interconnected operation described above by the control of generated renewable energy power instead of the internal combustion engine type power generator, and therefore can be regarded as "on-site self-power generation equipment without the need for fuel."

Next, description will be given of a power balance under a low load (example: 200 kW) such as on a holiday. In the present example, as described above, 100 kW is introduced as the base flow power in order to prevent a reverse flow due to a sudden decrease of the load side. Therefore, when the load power is 0 kW, the generated renewable energy power is reduced to 0 kW, and this is also enabled by performing the flow control by phase control and the like.

Figure 23:
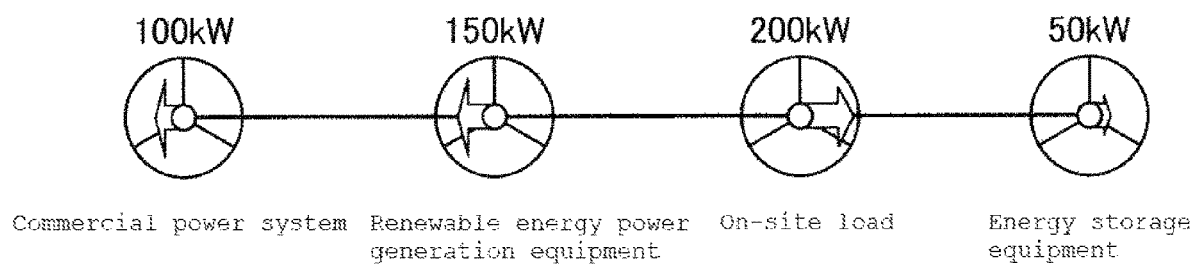
FIG. 23 is an explanatory view showing an image of interconnected operation by the commercial power system, renewable energy power generation equipment, and energy storage equipment.

FIG. 23 shows a power balance under a low load (example: 200 kW) such as on a holiday and an image of interconnected operation when the energy storage equipment 120 is additionally connected on-site. The power generated by the renewable energy power generation equipment 110 is suppressed to 100 kW when the power supplied from the commercial power system is 100 kW and the power of the load side is 200 kW, however, when the energy storage equipment 120 of 50 kW is connected as shown in FIG. 23, the power generated by the renewable energy power generation equipment 110 rises to 150 kW although this is suppressed compared with the maximum power generation amount.

With conventional renewable energy power generation equipment such as photovoltaic power generation equipment, the generated power has depended on weather conditions, and therefore, at maximum power generation time (example: 500 kW) on holidays, etc., a reverse flow of surplus electricity has occurred on the commercial power system side. On the other hand, in the present example, suppression power (surplus electricity) of the renewable energy power generation equipment 110 is automatically stored in the energy storage equipment 120 such as a storage battery.

Briefly describing the flow from the start of charging (0 kW) to the increase in charge amount (50 kW) and from the power generation amount (100 kW) to the increase in power generation amount (150 kw) described above, the flow amount increases for a short time with the start of charging, but the flow amount is returned to the original amount upon detection of the increase in charging by the charge amount detector 94 and the increase in power generation amount being carried out by the power generation amount command calculator 93. For balancing these controls, it is an important operation to regulate each of the sensitivities K of the flow regulating section 23, the power generation regulating section 33, and the charge regulating section 53, but empirically, taking a value between K=1~2 can provide stability.

The surplus electricity of the renewable energy power generation equipment 110 under a low load such as on a holiday, which was initially 0 kW and then 50 kW as in FIG. 23 into the energy storage equipment 120, is raised to, for example, 400 kW at the maximum by the charge amount control unit 50. When the demand power amount by the on-site load 86 is 200 kW and the power to be supplied to the energy storage equipment is 400 kW, the power balance is maintained by electric power of a total of 600 kw consisting of 100 kW supplied from the commercial power system side and 500 kW supplied from the renewable energy power generation equipment side.

When the demand power amount by the on-site load 86 decreases at this time, electric power detected by the flow detector 13 decreases from 100 kW, and therefore, the generated power is reduced by the flow operation signal $S_{24}$ from the flow control unit 20 to increase the flow, so as to return the flow power to the setting value of 100 kW.

When an energy storage capacity decreases in this state due to the capacity of the energy storage equipment 120 side, etc., the energy storage amount decreases based on a command of the power conditioner for power charge 122. When the energy storage amount decreases, the power generation amount is decreased by the power generation amount command calculator 93, and the energy storage amount decreases from 400 kW to 0 kW and storage energy control thus ends.

<Automatic Setting Value Control for Demand Control>

Subsequently, description will be given of automatic setting value control for demand control in the present example by use of FIGS. 15A-C to FIG. 17.

Figure 15A:
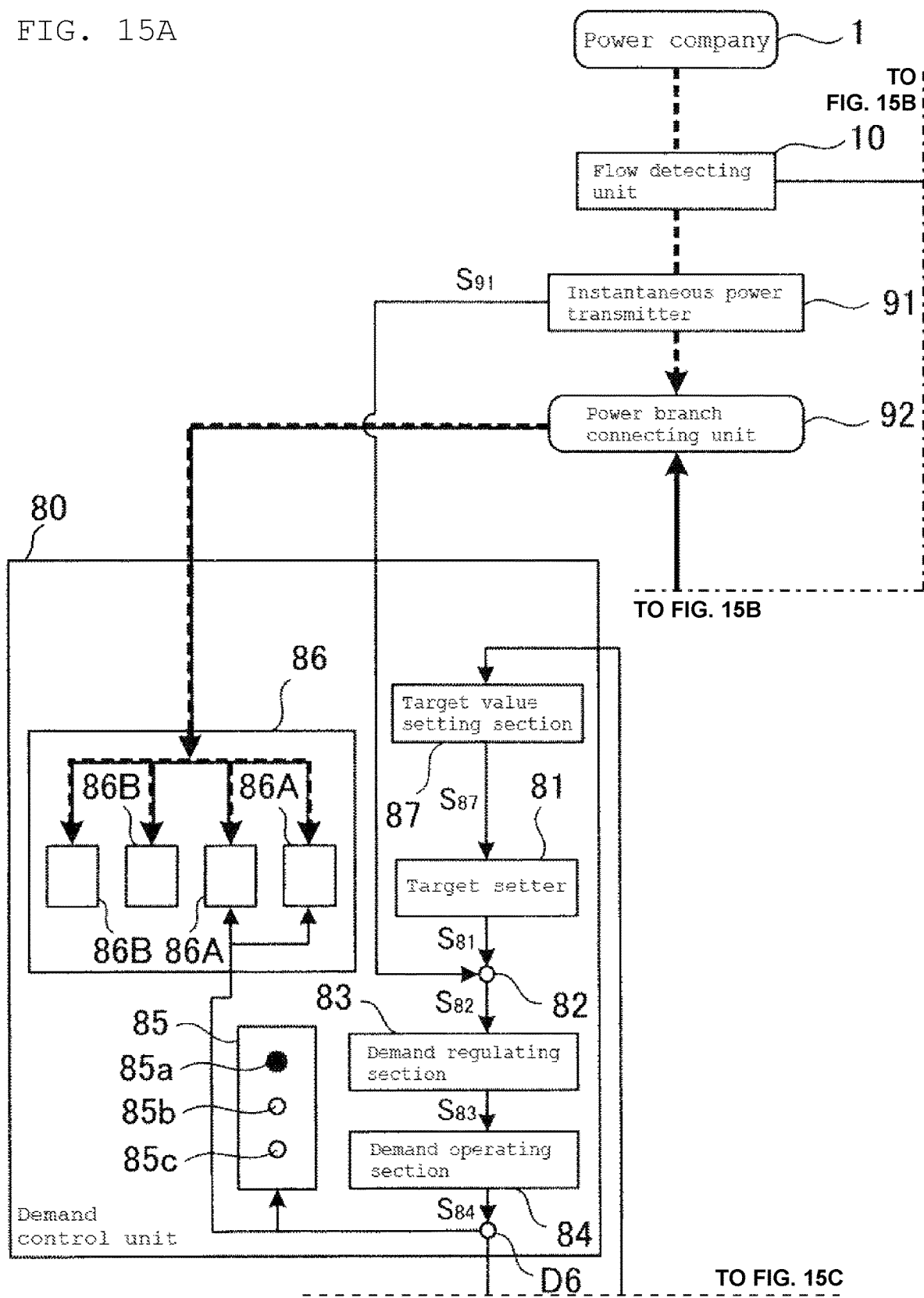
FIGS. 15A-C illustrate an explanatory diagram showing a structure related to demand control in the renewable energy power generation and storage control device for reverse flow prevention type self-consumption according to Example 1 of the present invention.
Figure 15B:
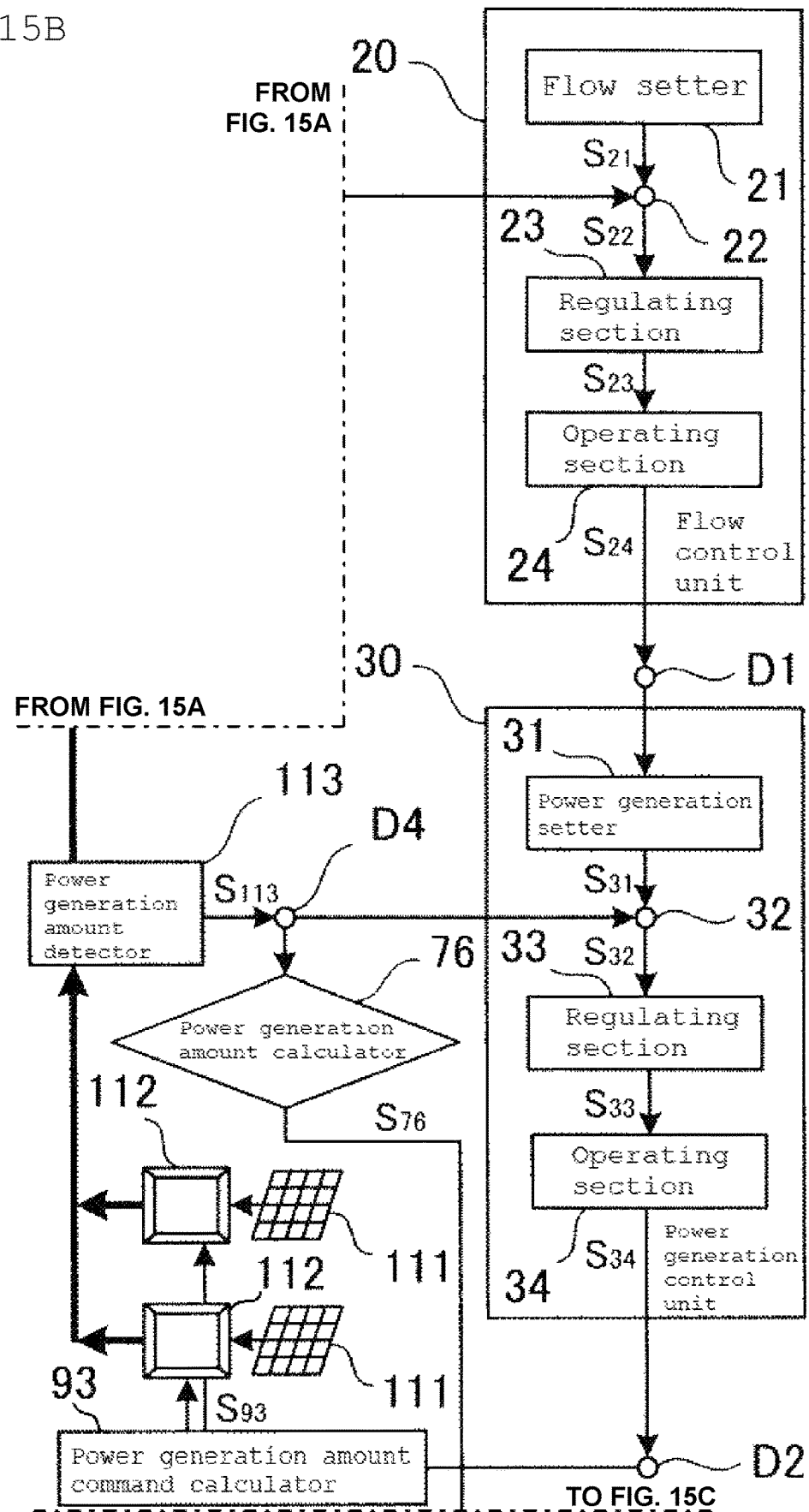
Figure 15C:
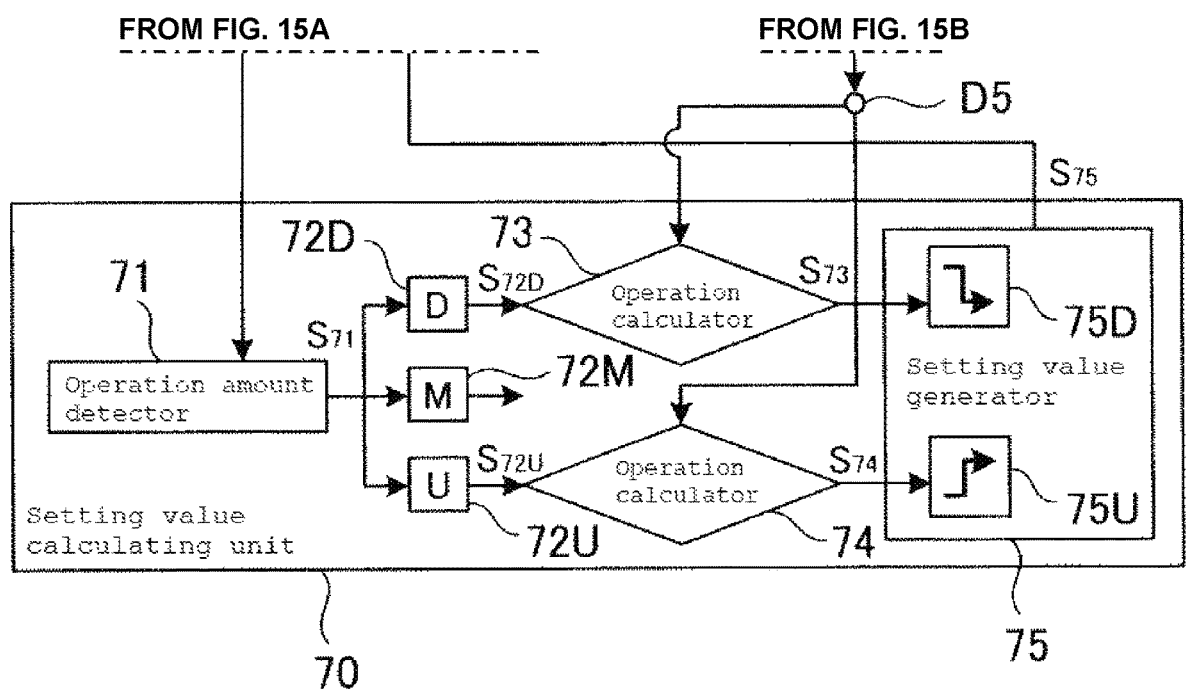

As shown in FIGS. 15A-C, the setting value calculating unit 70 includes an operation amount detector 71 that detects the state of a demand operation amount based on a demand operation signal $S_{84}$ sent from a demand operating section 84 to be described later, a down contact element 72D that sends a demand operation signal $S_{71}$ from the operation amount detector 71 as a down signal $S_{72D}$ to an operation calculator 73 to be described later when the demand operation amount is large (for example, 90%), an up contact element 72U that sends the demand operation signal $S_{71}$ from the operation amount detector 71 as an up signal $S_{72U}$ to an operation calculator 74 to be described later when the demand operation amount is small (for example, 50%), the operation calculator 73 that outputs the result of AND processing of the down signal $S_{72D}$ and a power generation amount signal $S_{76}$ sent from a power generation amount calculator 76 as an operation signal $S_{73}$, the operation calculator 74 that outputs the result of AND processing of the up signal $S_{72U}$ and the power generation amount signal $S_{76}$ sent from the power generation amount calculator 76 as an operation signal $S_{74}$, and a setting value generator 75 that outputs as a setting signal $S_{73}$ a setting value changed according to the operation signal sent from the operation calculator 73 or 74. The setting value generator 75 includes a down element generator 75D for decreasing the setting signal and an up element generator 75U for increasing the setting signal. Reference sign D5 shown in FIG. 15C denotes a branching portion.

The demand control unit 80 includes a target setter 81 that sets a target value of the demand control based on a setting signal $S_{87}$ sent from a target value setting section 87 to be described later and outputs the target value as a demand target value $S_{81}$, a demand comparing section 82 that outputs the result of a comparison of the demand target value $S_{81}$ and a signal $S_{91}$ of flow power (instantaneous power) sent from the instantaneous power transmitter 91 as a demand comparison signal $S_{82}$, a demand regulating section 83 that outputs a value according to a sensitivity K as a demand regulation signal $S_{83}$ based on the demand comparison signal $S_{82}$, a demand operating section 84 that outputs as a demand operation signal $S_{84}$ a demand operation amount to control the demand in response to the demand regulation signal $S_{83}$, and a control display section 85 that displays a suppression state of power consumption of the controllable loads 86A. The control display section 85 includes a 1-stage control indicator lamp 85a that indicates, for example, 10% suppression, a 2-stage control indicator lamp 85b that indicates, for example, 20% suppression, a 3-stage control indicator lamp 85c that indicates, for example, 30% suppression. The target value setting section 87 sets a target value based on the setting signal $S_{73}$ sent from the setting value generator 75, and reference sign 86 shown in FIG. 15A denotes an on-site load, and the on-site load includes the controllable loads 86A of air conditioners, lights, and the like and uncontrollable load 86B such as production machines. Reference sign D6 denotes a branching portion.

In FIGS. 15A-C, the charge/discharge determining unit 40, the charge amount control unit 50, the discharge amount control unit 60, and the energy storage equipment 120 are omitted in the illustrations.

In general, for a basic electricity rate on the premises of a consumer of electric power, the demand contract system that continues for one year is adopted according to the maximum demand power amount per 30 minutes (demand). For this reason, the consumer of electric power makes an effort to suppress the demand, such as, for example, setting a demand target value Pc as shown in FIG. 16 and suspending the controllable loads 86A.

Figure 16:
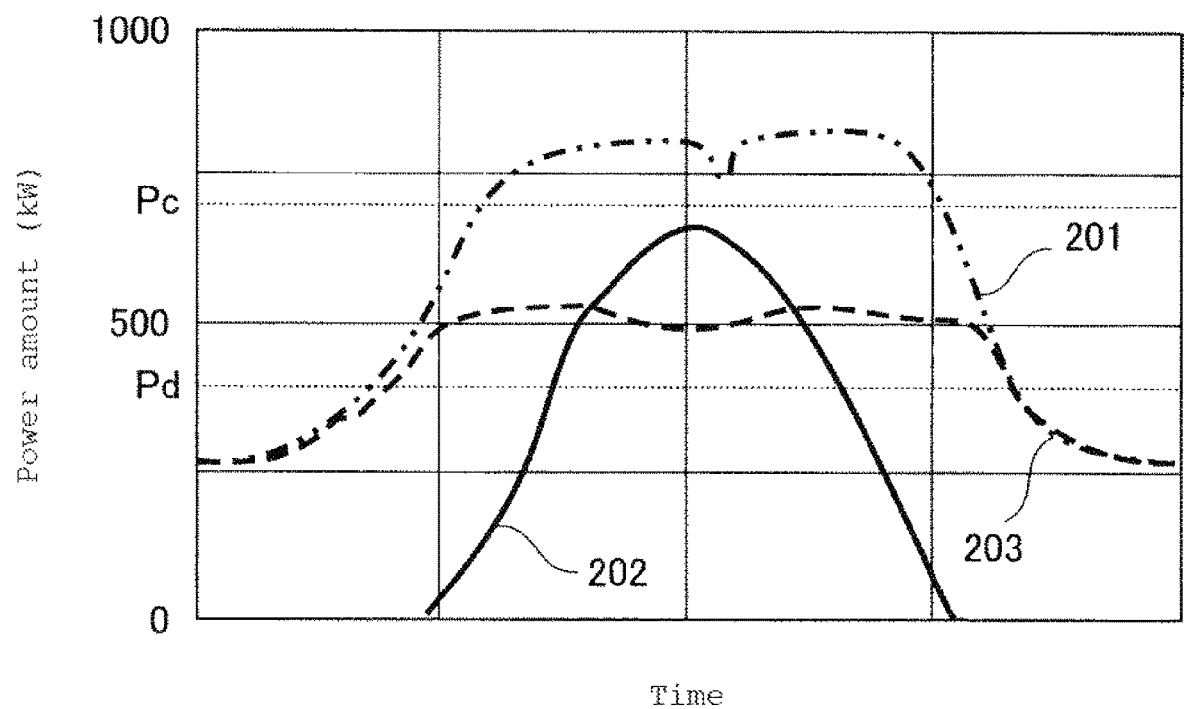
FIG. 16 is a graph showing the relationship of the demand power amount, the photovoltaic power generation amount, and the flow power amount and a demand setting value on a sunny weather day and under a high load.

On the other hand, when the renewable energy power generation equipment 110 is connected on the premises, the demand value decreases like the flow power amount 203 shown in FIG. 16. Therefore, it is even possible to change the demand target value, for example, from Pc to Pd shown in FIG. 16. However, the renewable energy power generation amount changes depending on weather conditions as well, and it therefore is preferable to provide an automatic demand setting function that automatically changes the demand target value Pd according to the change in renewable power generation amount.

In the present example, as shown in FIGS. 15A-C and described above, instantaneous power of the flow power is detected by the instantaneous power transmitter 91, and this is used as an input signal of the demand control unit 80. A deviation (demand comparison signal $S_{82}$) obtained by comparing the demand target value $S_{81}$ set by the target setter 81 of the demand control unit 80 and the signal $S_{91}$ of the flow power (instantaneous power) sent from the instantaneous power transmitter 91 by the demand comparing section 82 is sent to the demand operating section 84 through the demand regulating section 83, and the demand operation signal $S_{84}$ is sent from the demand operating section 84 through the branching portion D6 to the control display unit 85 and the controllable loads 86A such as air conditioners and is also sent to the operation amount detector 71 of the setting value calculating unit 70.

In the setting value calculating unit 70, when the demand operation signal $S_{84}$ sent to the operation amount detector 71 is greater than a preset threshold, the down signal $S_{72D}$ is sent to the operation calculator 73 through the down contact element 72D, and the result of AND processing with the power generation amount signal $S_{76}$ from the power generation amount calculator 76 performed in the operation calculator 73 is sent to the down element generator 75D of the setting value generator 75 as the operation signal $S_{73}$. Namely, F=D and E is provided, in which the power generation amount signal $S_{76}$ is E, the down signal $S_{72D}$ is D, and the operation signal $S_{73}$ is F.

On the other hand, when the demand operation signal $S_{84}$ sent to the operation amount detector 71 is greater than the preset threshold, the up signal $S_{72U}$ is sent to the operation calculator 74 through the up contact element 72U, and the result of AND processing with the power generation amount signal $S_{76}$ from the power generation amount calculator 76 performed in the operation calculator 74 is sent to the up element generator 75U of the setting value generator 75 as the operation signal $S_{74}$. Namely, V=U and E is provided, in which the power generation amount signal $S_{76}$ is E, the up signal $S_{72U}$ is U, and the operation signal $S_{74}$ is V.

Figure 17:
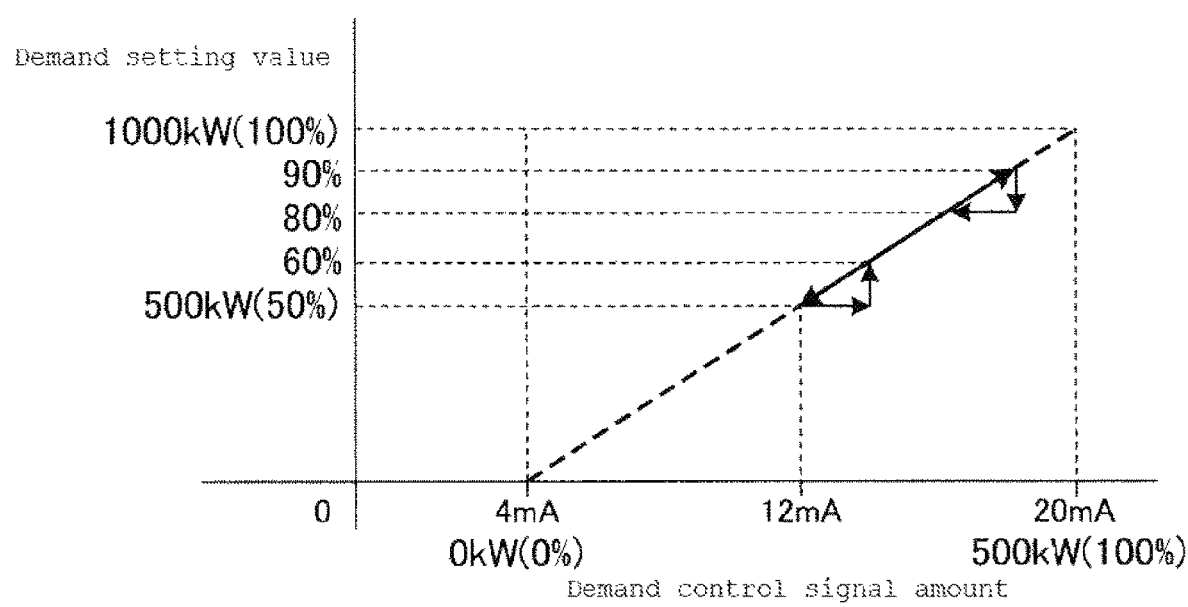
FIG. 17 is an explanatory diagram showing a modification of the demand setting value.

The setting value generator 75 accordingly sends the setting signal $S_{73}$ to the target value setting section 87, in response to the operation signal F or V sent from the operation calculator 73 or 74, so as to reduce the demand target value to 80% when the demand target value is 90% and is greater than a preset threshold and to increase the demand target value to 60% when it is 50% and is smaller than the preset threshold, as shown in FIG. 17.

It should be noted, however, that this function operates only when the renewable energy power generation amount is the maximum or close to the maximum (hereinafter, referred to when performing near maximum power generation). In other words, when the demand operation signal $S_{84}$ sent to the operation amount detector 71 is larger than a preset threshold and when the renewable energy power generation equipment 110 is performing near maximum power generation, the down signal D is sent to the down element generator 75D as the operation signal F. On the other hand, when the demand operation signal $S_{84}$ sent to the operation amount detector 71 is smaller than the preset threshold and when the renewable energy power generation equipment 110 is performing near maximum power generation, the up signal U is sent to the up element generator 75U as the operation signal V. This is because in a state where the renewable energy power generation amount is close to the maximum, the flow power amount is also of a value close to the maximum and therefore the flow control is not affected.

As above, in the present example, a demand setting value (setting signal $S_{87}$) is automatically changed to an optimum value according to a change in the demand operation amount (demand operation signal $S_{84}$) during renewable energy power generation in the setting value calculating unit 70.

Conventionally, setting values of the demand control unit 80 have been fixed values (manual setting), however, demand control with the fixed values does not function appropriately in a case where power generation is being performed by the renewable energy power generation equipment 110 as described above. On the other hand, in the present example, by sending the setting signal $S_{75}$ from the setting value calculating unit 70 to the demand setting unit 80, it is possible to, for example, reduce the demand target value that is supposed to be 90% to 80%, according to the renewable energy power generation amount by the renewable energy power generation equipment 110. If it is configured so as to stop (turn off) the setting signal $S_{75}$ in a status where the demand target value has reached 80%, the demand setting value is changed to 80% and fixed there until a next setting signal $S_{75}$ arrives.

Next, description will be given of the demand control in the present example and display examples in the control display section 85 associated therewith by use of FIG. 18 and FIG. 19. The control display section 85 turns on or off the indicator lamps 85a to 85c in response to the demand operation signal $S_{84}$ from the demand operating section 84 that is branched therefrom by the branching portion D6. In the control display section 85, the 1-stage control indicator lamp 85a, the 2-stage control indicator lamp 85b, and the 3-stage control indicator lamp 85c indicate states of suppression of the power consumption of air conditioners and the like in this order.

Figure 18:
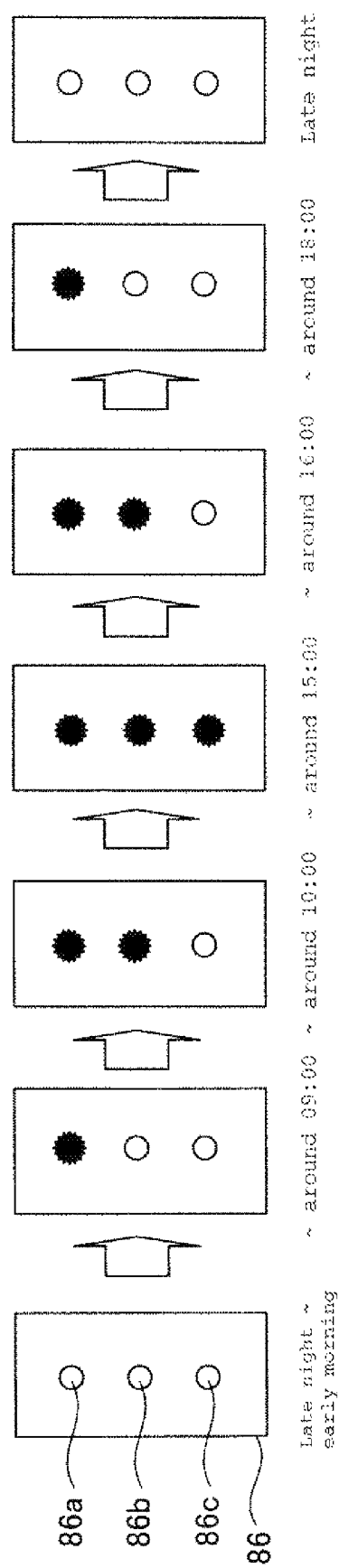
FIG. 18 is an explanatory view showing a demand control state when renewable energy power generation equipment is not installed.

First, a demand control example in a general demand control device (for example, a demand setting value of 700 kW) without renewable energy power generation equipment is shown in FIG. 18, and examples of the demand setting value, on-site load, and demand control in this case are shown in Table 1.

TABLE 1

|  | Late night ~ early morning | ~ around 09:00 | ~ around 10:00 | ~ around 15:00 | ~ around 16:00 | ~ around 18:00 | ~ late night |
|---|---|---|---|---|---|---|---|
| Demand setting value | 700 kW | 700 kW | 700 kW | 700 kW | 700 kW | 700 kW | 700 kW |
| On-site load | 300 kW | 800 kW | 900 kW | 1000 kW | 900 kW | 800 kW | 300 kW |
| Control | No control | 1-stage control | 2-stage control | 3-stage control | 2-stage control | 1-stage control | No control |

As shown in FIG. 18 and Table 1, in the case of a general demand control device without renewable energy power generation equipment, the on-site load is 300 kW from late night to early morning with respect to the demand setting value of 700 kW, so that the demand control does not operate (no control), but when it is around 09:00 and the load rises to 800 kW, 1-stage control operates, and the 1-stage control indicator lamp 85a is turned on. If the load increases to 900 kW at around 10:00, 2-stage control operates, and the 2-stage control indicator lamp 85b is turned on and control power increases. Further, when the load further reaches the maximum (1000 kW) from around 10:00 to around 15:00, 3-stage control operates, and the 3-stage control indicator lamp 85c is turned on. Thereafter, when it is around 16:00 and the load is 900 kW, the control shifts to 2-stage control, and when the load then is 800 kW around 18:00, the control shifts to 1-stage control, and the demand control stops functioning (no control) when the load decreases to 300 kW during late night.

Figure 19:
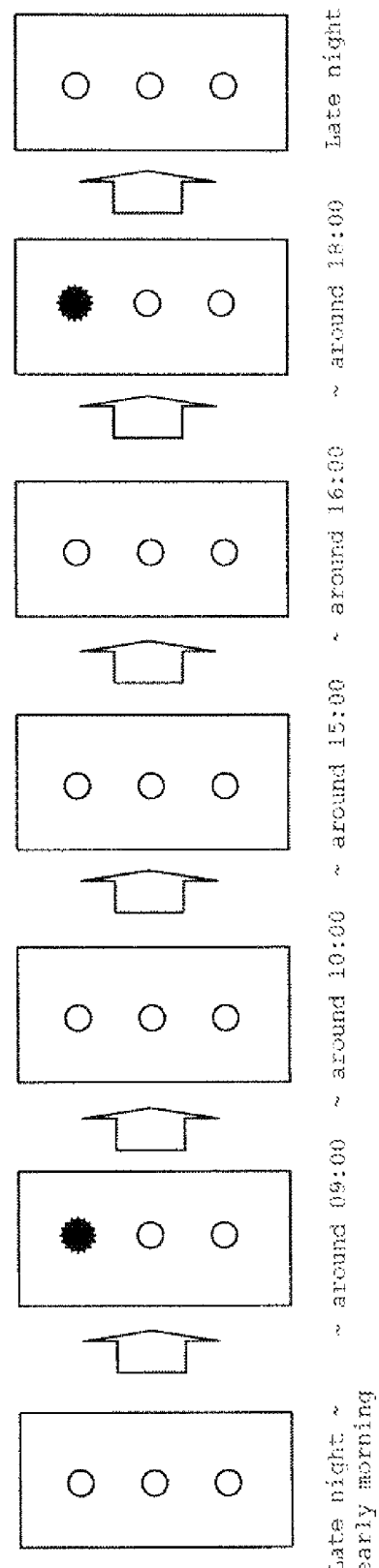
FIG. 19 is an explanatory view showing a conventional demand control state when the renewable energy power generation equipment is installed.

Next, a demand control example in a case where the renewable energy power generation equipment 110 (provided as photovoltaic power generation equipment, for example) is installed on the premises is shown in FIG. 19, and examples of the demand setting value, on-site load, renewable energy power generation amount, and demand control in this case are shown in Table 2.

TABLE 2

|  | Late night ~ early morning | ~ around 09:00 | ~ around 10:00 | ~ around 15:00 | ~ around 16:00 | ~ around 18:00 | ~ late night |
|---|---|---|---|---|---|---|---|
| Demand setting value | 700 kW | 700 kW | 700 kW | 700 kW | 700 kW | 700 kW | 700 kW |
| On-site load | 300 kW | 800 kW | 900 kW | 1000 kW | 900 kW | 800 kW | 300 kW |
| Renewable energy power generation amount | 0 kW | 50 kW | 400 kW | 500 kW | 400 kW | 50 kW | 0 kW |
| Control | No control | 1-stage control | No control | No control | No control | 1-stage control | No control |

As shown in FIG. 21 and Table 2, in this case, the amount of renewable energy power generation is 50 kW until around 09:00 and the flow power amount is reduced to substantially 750 kW by subtraction of 50 kW from the load of 800 kW, but because the demand setting value is 700 kW, 1-stage control functions. Thereafter, when the amount of renewable energy power generation is 400 kW and the flow power amount is reduced to substantially 500 kW at around 10:00, the demand control no longer functions. This state continues until around 16:00, and thereafter, the same control as in the case without renewable energy power generation equipment of a general demand control device is performed. Namely, from around 09:00 to 16:00, a state is brought about in which the demand control does not function compared with the case without renewable energy power generation equipment of a general demand control device.

In order to improve this state, the demand setting value needs to be changed (reduced) according to the renewable energy power generation amount, however, the renewable energy power generation amount changes according to the weather conditions. Moreover, it is not practical to change the setting value manually every time the renewable energy power generation amount changes. Even so, there is still the necessity for demand control aiming at prevention of wasteful operation of air conditioners and the like.

Next, examples of the demand setting value, on-site load, renewable energy power generation amount, and demand control in a case where automatic demand control by the present example is performed are shown in Table 3.

point and the control shifts to 2-stage control. Thereafter, there is a further load fluctuation until around 15:00 and the control shifts to 3-stage control. Then, the renewable energy power generation amount is 400 kW until around 16:00, and the result of AND processing of the power generation amount signal E ($S_{76}$) from the power generation amount calculator 76 and the up signal U ($S_{72U}$) input through the up contact element 72U performed by the operation calculator 74, that is, the operation signal V ($S_{74}$) is sent to the setting value generator 75 to operate the setting value generator 75, and the control returns to 2-stage control. Namely, when the automatic demand control by the present example is performed, this means that the same control as the demand control example in a general demand control device without renewable energy power generation equipment described above shown in FIG. 18 is carried out.

While a description has been given of the state of an optimal demand control as a state of 2-stage control, as a matter of course, a 4-stage control method and multiple-stage control is available as well by increasing the number of components.

By a renewable energy power generation and storage control device for reverse flow prevention type self-consumption according to the present example configured as above, it is possible to automatically control generated power so as to be consumed only on-site or be stored in the energy storage equipment 120 irrespective of the fluctuating amount of self-consumption power so that renewable energy power generated on-site that easily changes depending on

TABLE 3

|  | Late night ~ early morning | ~ around 09:00 | ~ around 10:00 | ~ around 15:00 | ~ around 16:00 | ~ around 18:00 | ~ late night |
|---|---|---|---|---|---|---|---|
| Demand setting value | 700 kW | 700 kW | 400 kW | 300 kW | 400 kW | 700 kW | 700 kW |
| On-site load | 300 kW | 800 kW | 900 kW | 1000 kW | 900 kW | 800 kW | 300 kW |
| Renewable energy power generation amount | 0 kW | 50 kW | 400 kW | 500 kW | 400 kW | 50 kW | 0 kW |
| Control | No control | 1-stage control | 2-stage control | 3-stage control | 2-stage control | 1-stage control | No control |

As shown in Table 3, the on-site load is 800 kW with respect to the demand setting value of 700 kW from early morning to around 09:00. In this case, the down signal $S_{72D}$ is output from the down contact element 72D, and this is input to the operation calculator 73. On the other hand, the renewable energy power generation amount is 50 kW and is less than a preset threshold (for example, 400 kW), therefore, the setting value generator 75 does not operate. Therefore, 1-stage control is functioning. Thereafter, the renewable energy power generation amount is 400 kW until around 10:00, the result of AND processing of the power generation amount signal E ($S_{76}$) from the power generation amount calculator 76 and the down signal D ($S_{72D}$) input through the down contact element 72D performed by the operation calculator 73, that is, the operation signal F ($S_{73}$), is sent to the setting value generator 75 to operate the setting value generator 75, so that the demand setting value automatic setting function works. Accordingly, the setting value decreases until it falls under 90% serving as an operating weather conditions does not affect the commercial power system, and it is possible to operate the renewable energy power generation equipment 110 as efficiently as possible within a range of not causing a reverse flow. Moreover, it is possible to automatically charge only surplus electricity according to the amount of generated renewable energy power subjected to suppression control into the energy storage equipment 120. Further, electric power can be automatically and quickly supplied from the storage battery 121 only to the on-site load 86 within a range of not causing a reverse flow when renewable energy power generation is not performed. Further, the setting value of the demand control device that changes depending on renewable energy power generation can be automatically set according to the amount of renewable energy power generation, so that the optimal demand control is enabled.

Example 2

Description will be given of a renewable energy power generation and storage control device for reverse flow prevention type self-consumption according to Example 2 by use of FIGS. 24A-C. The present example is different mainly in the configuration of renewable energy power generation equipment 110 and energy storage equipment 120 compared with Example 1 described above. Other configurations are generally the same, and in the following, constituents that provide the same effects as those described in Example 1 are denoted by the same reference signs to omit overlapping descriptions, and description will be given mainly of the differences from Example 1.

Figure 24A:
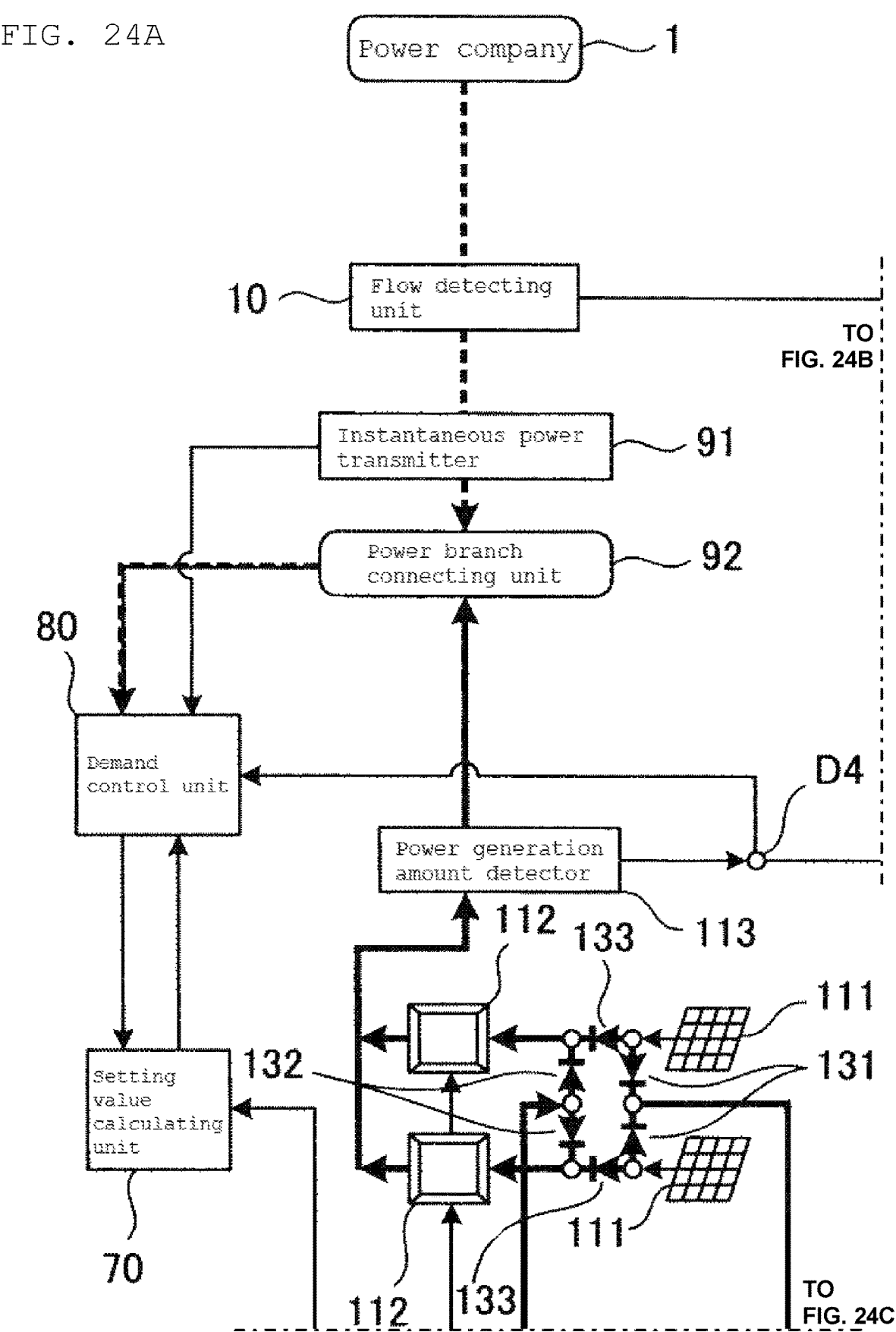
FIGS. 24A-C illustrate an explanatory diagram showing a structure related to charge and discharge control of a renewable energy power generation and storage control device for reverse flow prevention type self-consumption according to Example 2 of the present invention.
Figure 24B:
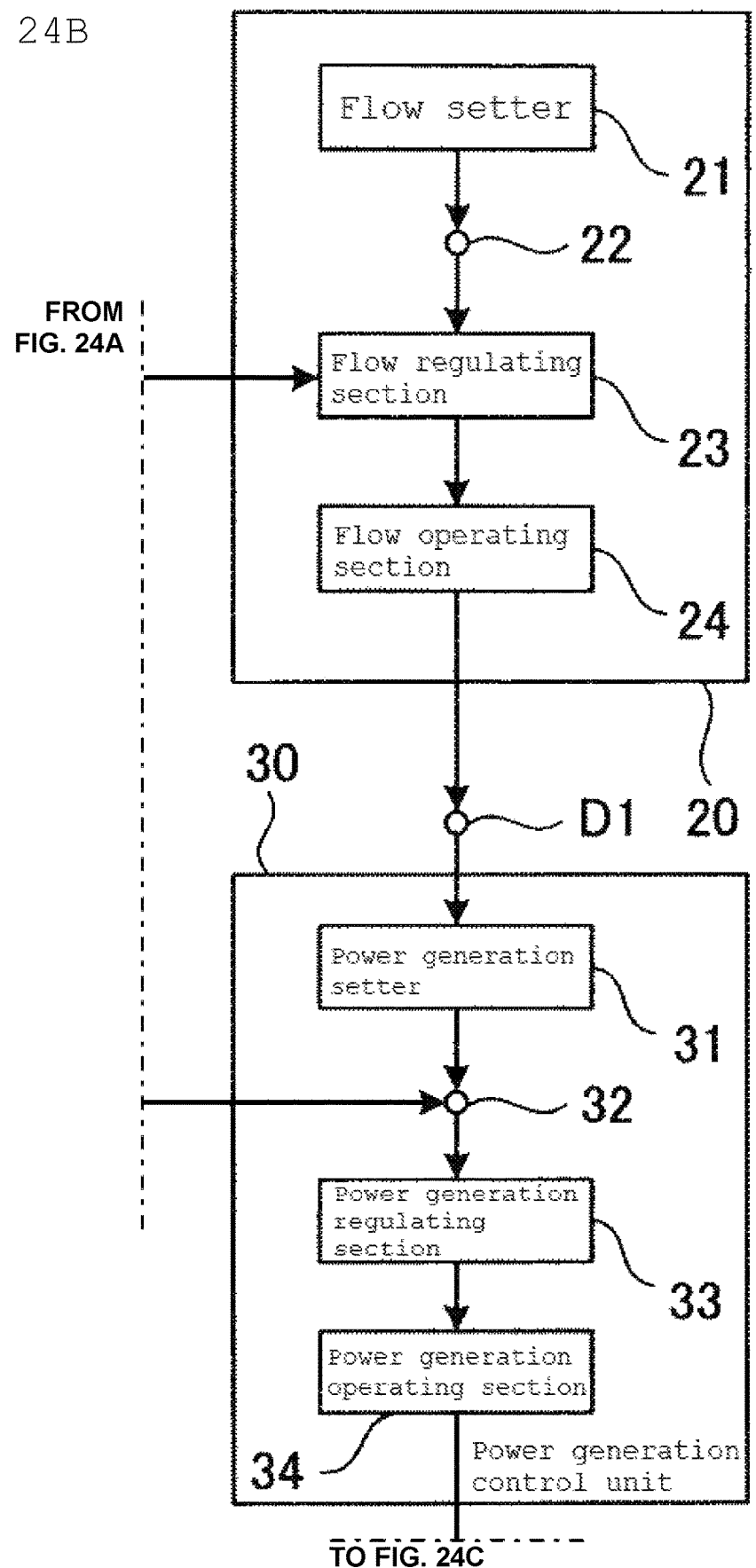
Figure 24C:
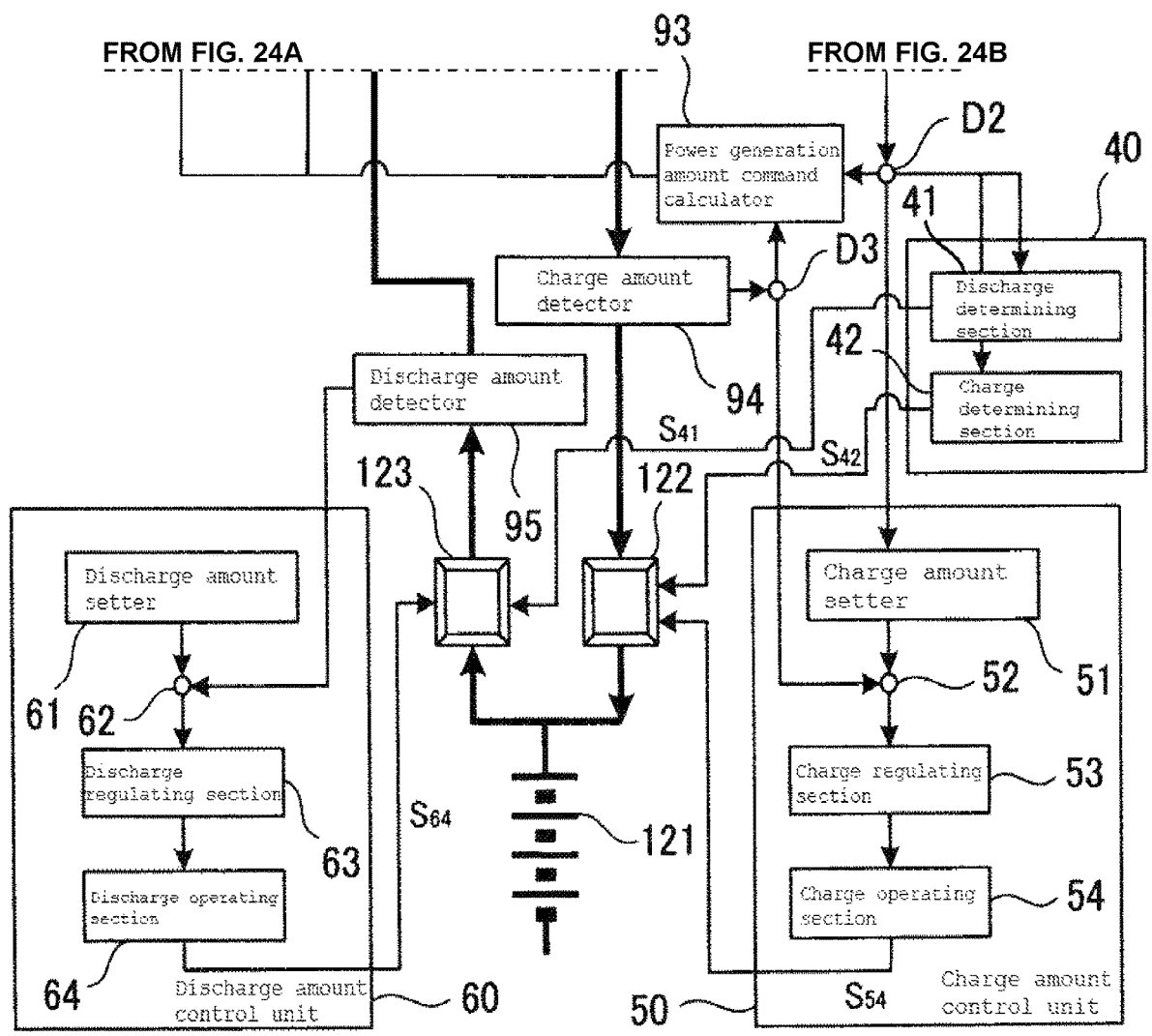

In the present example, because renewable energy power generation has an example that generates electricity initially as a direct current as photovoltaic power generation does, the renewable energy power generation equipment 110 (solar panels 111) is connected to a storage battery 121 via components having a directional function such as commutators 131 to 133, as shown in FIGS. 24A-C.

Namely, as shown in FIGS. 24A-C, because the solar panels 111 are connected to power conditioners for power generation 112, electricity generated by the solar panels 111 is consumed on-site as an alternating current via the power conditioners for power generation 112 if there is an on-site load 86, which is as in the foregoing, and in the present example, the electricity is at the same time energy-stored in the storage battery 121 via the commutators 131 and a power conditioner for power charge 122. The power conditioner for power charge 122 in this case is generally called a DC/DC (direct current/direct current) converter.

In the present example as well, the energy-storing ends at a point in time where the storage battery 121 is full (runs out of energy storage capacity) even if there is surplus electricity due to renewable energy power generation. While the stored energy is supplied from a power conditioner for power discharge 123 to the on-site load 86 via the commutators 132 and power conditioners for power generation 112, the possible charge calculator 65 described in Example 1 is no longer necessary because the flow direction is controlled by use of the commutators 131 to 133 in the present example, and the discharge amount is controlled to be constant by fixed setting from a discharge amount setter 61. In this case, the power conditioner for power discharge 123 is called a DC/DC (direct current/direct current) converter. The stored-energy power is prevented from reversely flowing to the solar cells 111, etc., by the commutators 133.

Further, in the present example as well, when a power generation instruction is output to a power generation control unit 30 from a flow control unit 20 whether it is daytime or nighttime, power generation is performed within a range of not causing a reverse flow through the power conditioners for power generation 112 based on the power generation amount command signal $S_{93}$ output from the power generation amount command calculator 93, and electric power is supplied to the on-site load 86.

In terms of the device configuration, when the storage battery 121 and the solar panels 111 are the same in voltage, it is also possible to adopt a simplified device configuration in which a discharge amount control unit 60 is omitted. In this case, generated renewable energy power and storing power are controlled only by the power containers 112 for power generation. In this case as well, the commutators 131 to 133 have a protective function, for example, between the respective cells.

Further, it is also possible to adopt a simplified configuration in which a direct current portion of the solar panels 111 and a direct current portion of the storage battery 121 are connected via the commutators 131 and the power conditioner for power charge 122. In this case, the power conditioner for power charge 122 is substituted by a contact connector (or contactless connector) and the contact connector (or contactless connector) is controlled by the charge command signal $S_{42}$ of the charge determining section 42 so as to energy-store surplus electricity.

By this configuration, according to the present example, generated renewable energy power can be directly output from the power conditioners for power generation 112 to the on-site load 86 and overall efficiency is improved, so that renewable energy power generation control by the automatic charging function when surplus electricity occurred in the renewable energy power generation equipment 110 is effective from the viewpoint of highly efficient operation as well. In the present example, by detecting surplus electricity of renewable energy power generation from a power generation operation signal $S_{34}$ and automatically controlling the same, the renewable energy surplus electricity can be efficiently consumed or energy-stored, and operational efficiency as a whole can be increased.

The present invention can be applied to the techniques for electrical grid stabilization, for automatic charging and discharging of a storage battery, for demand control, and for energy conservation.

REFERENCE NUMBERS

1 Power company
10 Flow detecting unit
11 Power receiving point
12 Watt-hour meter
13 Flow detector
20 Flow control unit
21 Flow setter
22 Flow comparing section
23 Flow regulating section
24 Flow operating section
30 Power generation control unit
31 Power generation setter
32 Power generation comparing section
33 Power generation regulating section
34 Power generation operating section
40 Charge/discharge determining unit
41 Discharge determining section
42 Charge determining section
50 Charge amount control unit
51 Charge amount setter
52 Charge amount comparing section
53 Charge regulating section
54 Charge operating section
60 Discharge amount control unit
61 Discharge amount setter
62 Discharge amount setting comparing section
63 Discharge regulating section
64 Discharge operating section
65 Possible discharge calculator
70 Setting value calculation unit
71 Operation amount detector
72D Down contact element
72U Up contact element
73 Operation calculator
74 Operation calculator
75 Setting value generator
75D Down element generator
75U Up element generator
80 Demand control unit
81 Target setter
82 Demand comparing section 83 Demand regulating section
84 Demand operating section
85 Control display section
85a 1-stage control indicator lamp
85b 2-stage control indicator lamp
85c 3-stage control indicator lamp
86 On-site load
86A Controllable load
86B Uncontrollable load
87 Target value setting section
91 Instantaneous power transmitter
92 Power branch connecting unit
93 Power generation amount command calculator
94 Charge amount detector
95 Discharge amount detector
110 Renewable energy power generation equipment
111 Solar panel
112 Power conditioner for power generation
113 Power generation amount detector
120 Energy storage equipment
121 Storage battery
122 Power conditioner for power charge
123 Power conditioner for power discharge
131~133 Commutator

The invention claimed is:

1. A renewable energy power generation and storage control device for reverse flow prevention type self-consumption, comprising:
one or more power generation devices which generate electric power from renewable energy;
an electric power converter for power generation which is connected to each of the power generation devices and is constructed to condition an output amount of the electric power generated by the power generation device;
a power generation amount detecting unit which detects an amount of power output from the electric power converter for power generation as a detected power output and outputs the amount of power from the electric power converter for power generation as a power generation signal;
a flow detecting unit which detects an amount of power supplied from a commercial power system as a detected supplied power and outputs the amount of power supplied from the commercial power system as a flow signal;
a flow control unit which outputs a flow operation amount according to a result of a comparison of a preset target value with the flow signal;
a power generation control unit which controls the amount of power output from the electric power converter for power generation based on the flow operation amount that is inputted from the flow control unit;
an instantaneous power detecting unit which detects instantaneous power supplied to loads that are supplied with electric power from the commercial power system through a power receiving point as a detected supplied instantaneous power and outputs the detected supplied instantaneous power as an instantaneous power signal;
a demand control unit which outputs a demand operation amount to make power consumption of all loads approximate to a demand target value only for a load capable of automatic control of the electric power out of all loads; and
a setting value calculating unit which obtains the demand target value, wherein the power generation control unit sets a power generation target value based on the flow operation amount, obtains an amount of generated power to be output from the electric power converter for power generation based on the result of a comparison of the power generation target value with the power generation amount signal, and outputs the amount of generated power as a power generation operation amount,
wherein the demand control unit outputs the demand operation amount to the load capable of automatic control of the electric power out of all of the loads according to a result of a comparison of the demand target value obtained by the setting value calculating unit, and
wherein the setting value calculating unit is configured to determine whether to change a setting value according to the amount of power output from the electric power converter for power generation.

2. The renewable energy power generation and storage control device for reverse flow prevention type self-consumption according to claim 1, further comprising:
a storage device;
an electric power converter for power charge which is constructed to condition an output amount of electric power from a power branch connecting unit and direct the electric power to the storage device;
a charge amount detecting unit which detects an amount of charging power into the storage device and outputs a charge amount signal; and
a charge control unit which controls, based on the power generation operation amount, an amount of power output from the electric power converter for power charge,
wherein the charge control unit sets a charging target value based on the power generation operation amount, obtains an amount of charging power to be output from the electric power converter for power charge that is according to a result of a comparison of the charging target value to the charge amount signal, and outputs the amount of charging power as a charge operation amount.

3. The renewable energy power generation and storage control device for reverse flow prevention type self-consumption according to claim 2, wherein the charge control unit sets a charging rate by comparing a first charging rate to a second charging rate,
wherein the first charging rate relates to when the power generation operation amount is smaller than a preset threshold, and
wherein the second charging rate relates to when the power generation operation amount is greater than the preset threshold.

4. The renewable energy power generation and storage control device for reverse flow prevention type self-consumption according to claim 2, further comprising:
an electric power converter for power discharge constructed to condition an output amount of electric power from the storage device;
a discharge amount detecting unit which detects an amount of discharged power from the storage device and outputs a discharge amount signal; and
a discharge control unit which controls an amount of power outputted from the electric power converter for power discharge,
wherein the discharge control unit sets a discharging target value based on the flow operation amount, obtains an amount of discharged power to be outputted from the electric power converter for power discharge according to a result of a comparison between the discharging target value and the discharge amount signal, and outputs the amount of discharged power as a discharge operation amount when at least a predetermined amount of power generation is not detected by the power generation amount detecting unit.

* * * * *